United States Patent
Kolleri

(10) Patent No.: US 10,089,521 B2
(45) Date of Patent: Oct. 2, 2018

(54) IDENTITY VERIFICATION VIA VALIDATED FACIAL RECOGNITION AND GRAPH DATABASE

(71) Applicant: VeriHelp, Inc., Seattle, WA (US)

(72) Inventor: Bhushan Kolleri, Freemont, CA (US)

(73) Assignee: VeriHelp, Inc., Seattle, WA (US)

( * ) Notice: Subject to any disclaimer, the term of this patent is extended or adjusted under 35 U.S.C. 154(b) by 0 days.

(21) Appl. No.: 15/256,413

(22) Filed: Sep. 2, 2016

(65) Prior Publication Data

US 2018/0068173 A1    Mar. 8, 2018

(51) Int. Cl.
| | |
|---|---|
| G06K 9/00 | (2006.01) |
| G06K 9/62 | (2006.01) |
| G06F 17/30 | (2006.01) |
| G01S 19/13 | (2010.01) |
| G06F 3/0484 | (2013.01) |

(52) U.S. Cl.
CPC .......... *G06K 9/00288* (2013.01); *G01S 19/13* (2013.01); *G06F 17/3028* (2013.01); *G06F 17/30241* (2013.01); *G06K 9/00228* (2013.01); *G06K 9/00268* (2013.01); *G06K 9/6202* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 8,457,367 B1* | 6/2013 | Sipe | G06K 9/00221 382/118 |
| 2004/0201751 A1* | 10/2004 | Bell | H04N 5/772 348/231.99 |
| 2004/0223629 A1* | 11/2004 | Chang | G06K 9/00228 382/118 |
| 2009/0034805 A1* | 2/2009 | Perlmutter | G06F 17/30256 382/118 |

(Continued)

OTHER PUBLICATIONS

"Face Recognition," Federal Bureau of Investigation publication, retrieved from www.fbi.gov on Jun. 23, 2016, pp. 92-99, 8 pages.

(Continued)

*Primary Examiner* — Manav Seth
*Assistant Examiner* — David Perlman
(74) *Attorney, Agent, or Firm* — Klarquist Sparkman, LLP

(57) ABSTRACT

Technologies are provided herein for verifying identities of individuals via facial recognition and a graph database. Images of individuals to be identified can be can be captured with multiple mobile devices, such as by crowdsourcing, and transmitted to an identity verification server for identification. The identity verification server can maintain a graph database and locate a potential identity for an individual via facial recognition. Confirmation can be achieved by transmitting an image already in the database. A wide variety of validation techniques can be employed to filter out low quality data and improve the quality of matching. The identity verification server can manage profile information for the verified identity by creating and analyzing nodes and (Continued)

relationship records in the graph database. The identity verification server can update the graph database to track associations between verified identities.

19 Claims, 23 Drawing Sheets

(56) References Cited

U.S. PATENT DOCUMENTS

| | | | |
|---|---|---|---|
| 2011/0058787 A1* | 3/2011 | Hamada | G11B 27/10 386/224 |
| 2014/0310739 A1* | 10/2014 | Ricci | H04W 48/04 725/28 |
| 2015/0104082 A1* | 4/2015 | Kim | G06K 9/00221 382/118 |
| 2016/0092527 A1* | 3/2016 | Kang | G06F 17/30569 707/756 |
| 2017/0103230 A1* | 4/2017 | O'Brien | G06F 21/6245 |
| 2017/0118207 A1* | 4/2017 | Madhu | H04L 63/0861 |
| 2017/0169237 A1* | 6/2017 | Calo | G06F 21/6218 |
| 2017/0193284 A1* | 7/2017 | Yoon | G06K 9/00248 |

OTHER PUBLICATIONS

"Facial recognition system," *Wikipedia*, retrieved from en.wikipedia.org on May 20, 2016, 12 pages.

"Graph database," *Wikipedia*, retrieved from en.wikipedia.org on May 20, 2016, 16 pages.

"Neo4j," *Wikipedia*, retrieved from en.wikipedia.org on May 20, 2016, 3 pages.

* cited by examiner

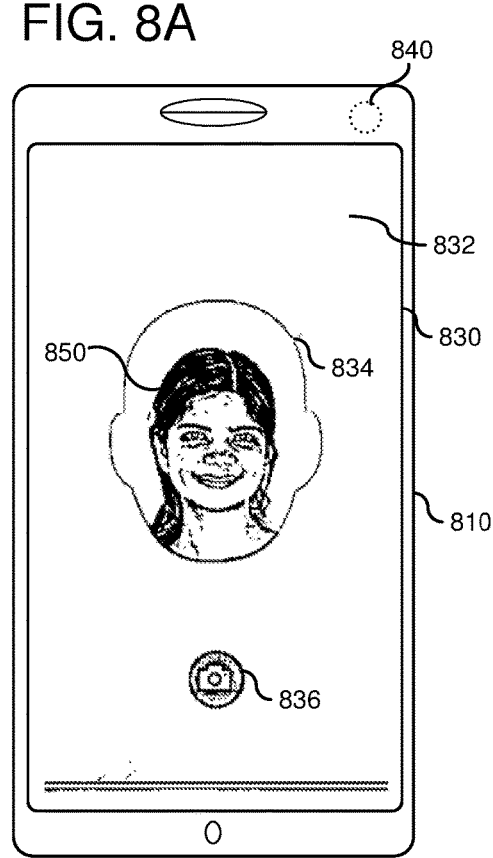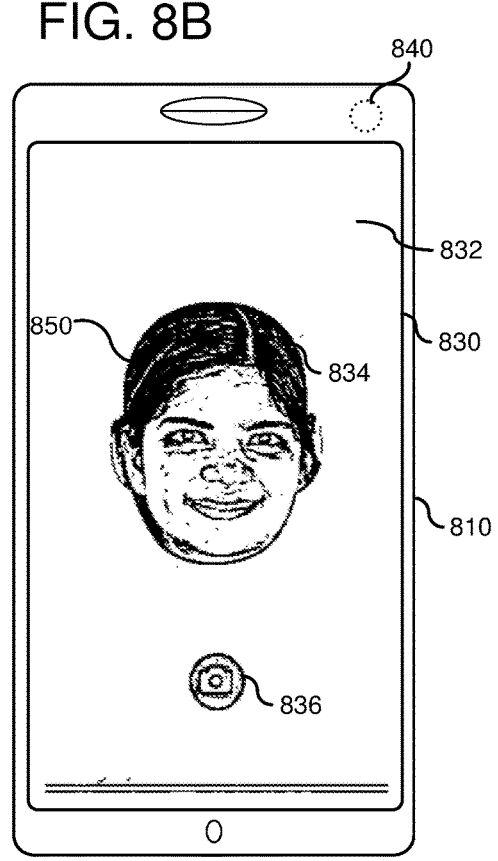
FIG. 8A
FIG. 8B

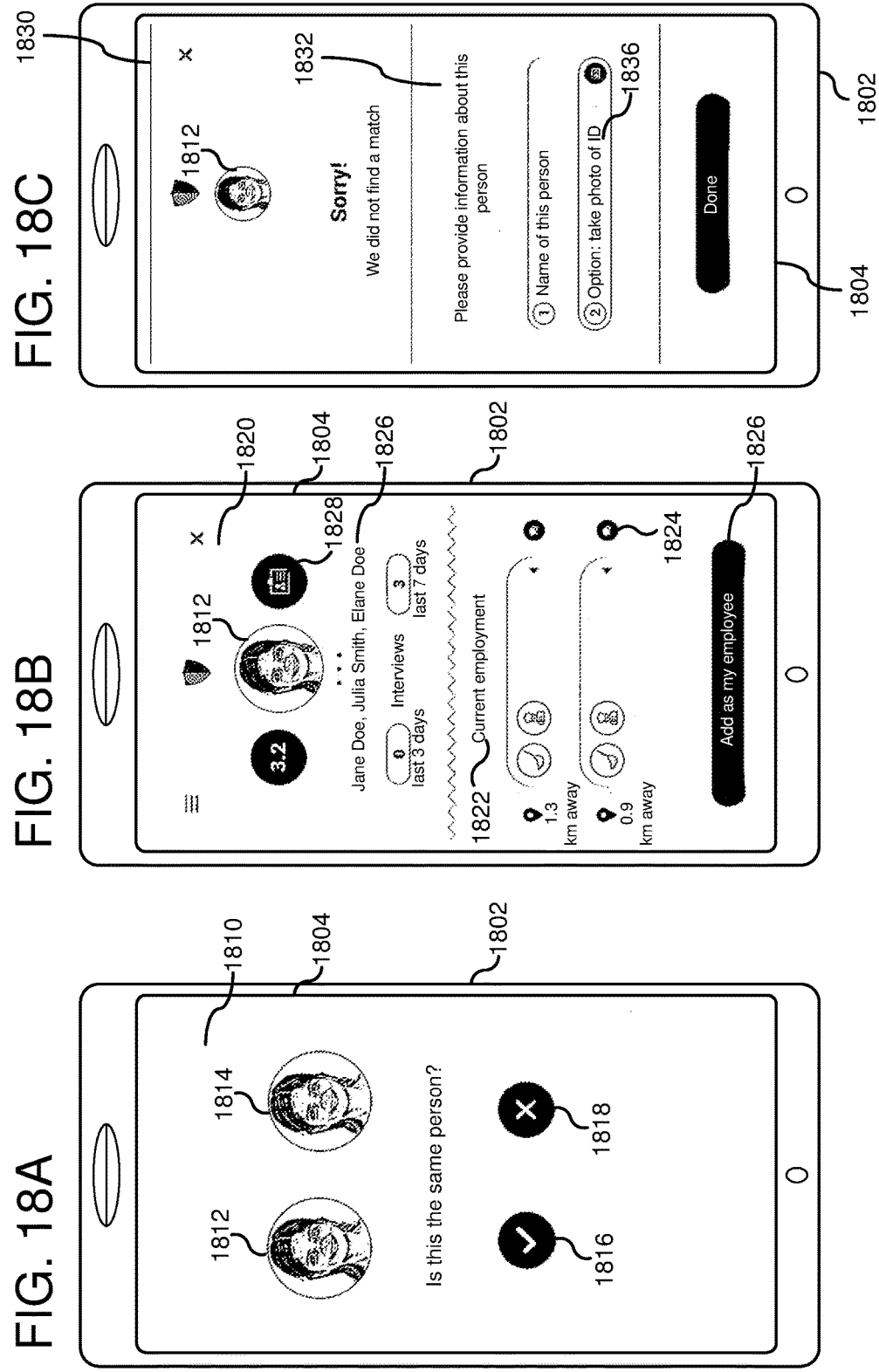

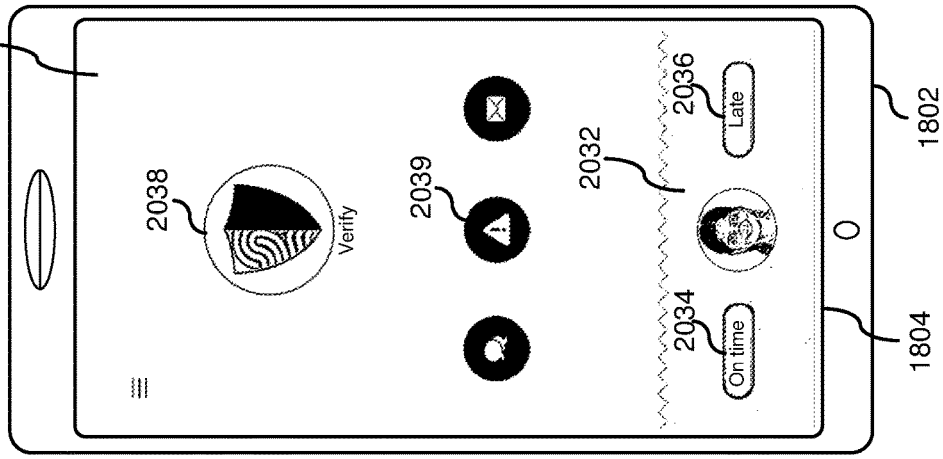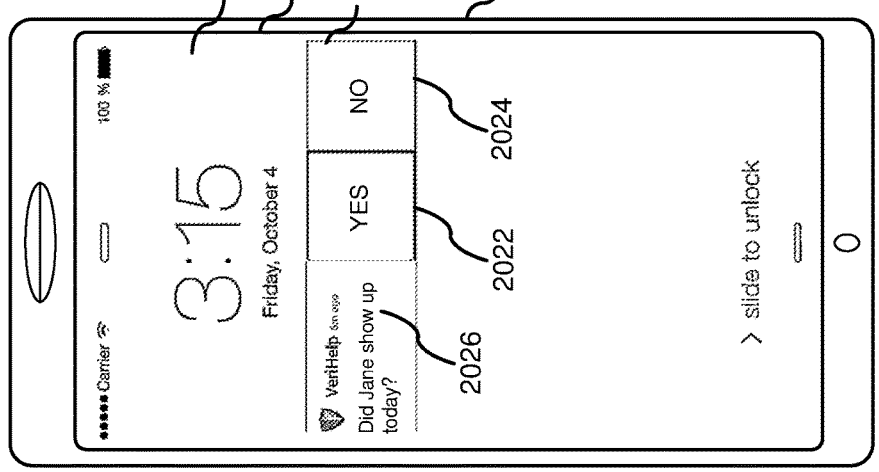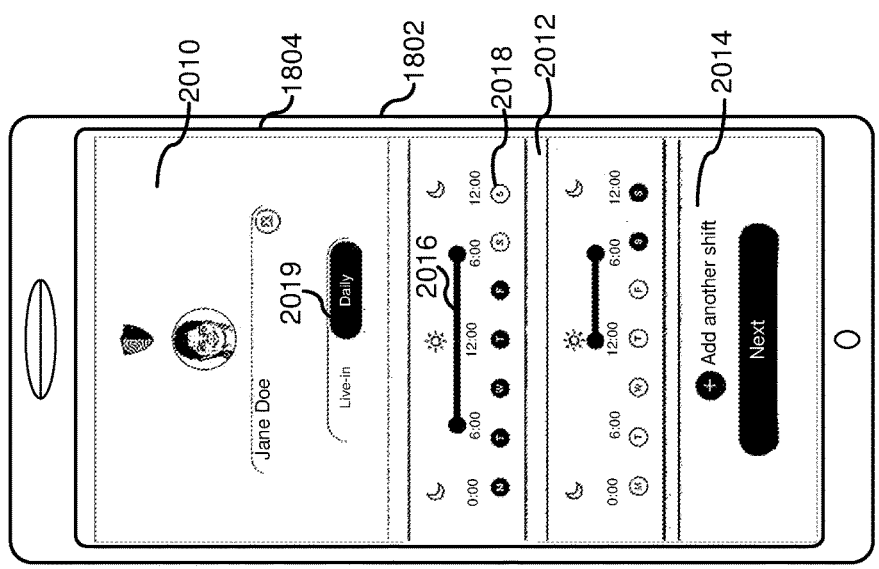

IDENTITY VERIFICATION VIA VALIDATED FACIAL RECOGNITION AND GRAPH DATABASE

BACKGROUND

Conventional systems for tracking individuals rely on demographic information, such as names, dates of birth, and government identity numbers, to identify individuals. However, some individuals may be unable or unwilling to provide requested identification information. Additionally, some individuals may provide false identification information, such as fake names or fake government identity numbers, in an attempt to hide their true identities.

There thus remains a need for a reliable way to verify the identity of an individual.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method of identity detection comprises: receiving an image from a mobile device; validating the received image; identifying facial features of a face depicted in the validated received image and generating a facial feature template that represents the identified facial features using a facial recognition engine; searching a facial feature template repository for one or more facial feature templates that are similar to the generated facial feature template; identifying one of the stored facial feature templates that matches the generated facial feature template with a match that is greater than or equal to a specified match threshold; retrieving an image associated with the identified facial feature template and transmitting the retrieved image to the mobile device; receiving a message from the mobile device indicating that the image received from the mobile device and the image transmitted to the mobile device depict a same person; determining that the image transmitted to the mobile device is associated with profile information in a data store; and transmitting the profile information to the mobile device.

In another embodiment, a non-transitory computer-readable medium comprises instructions that, when executed by a processor of a mobile computing device, cause the mobile computing device to perform operations, the operations comprising: capturing an image of the person using a camera of the mobile device; transmitting a request from the mobile device to a server to identify the person depicted in the captured image, the request comprising the captured image; receiving a second image at the mobile device, from the server, wherein the second image is a potential match to the captured image; displaying the received image on a user interface of the mobile device and prompting the user, via the user interface of the mobile device, to verify whether the received image is an image of the person; receiving an indication, via the user interface of the mobile device, that the received image is an image of the person; retrieving profile information associated with the received image from the server; and presenting the profile information to the user via the user interface of the mobile device.

In another embodiment, a system comprises: a mobile device, comprising a processor; a camera; a display; a global positioning system (GPS) antenna; and a storage storing an application that, when executed by the processor, causes the mobile device to perform identity verification operations, the operations comprising: capturing multiple images depicting a person using the camera; determining, by detecting one or more differences in the multiple images, that the multiple images are images of a person and not a picture of the person; obtaining GPS coordinates of the mobile device using the GPS antenna; transmitting a request to a server to verify an identity of the person, the request comprising at least one of the captured images and the GPS coordinates; receiving a matched image from the server; displaying the matched image and one or more user interface components on the display, the one or more user interface components configured to receive input indicating whether or not the matched image is an image of the person; receiving input via at least one of the one or more user interface components indicating that the matched image is an image of the person; transmitting a message to the server, indicating that the matched image is an image of the person; receiving information related to the identity of the person from the server; and displaying the information related to the identity of the person on the display. The system further comprises the server, comprising another processor and another storage storing instructions that, when executed by the another processor, cause the server to perform identity detection and validation operations, the operations comprising: receiving the request to verify the identity of the person, comprising the at least one captured image and GPS coordinates, from the mobile device; determining, based at least in part on the GPS coordinates, that the image is valid; transmitting the captured image to a facial recognition server; receiving an identifier of the matched image from the facial recognition server; transmitting the matched image to the mobile device; receiving the message from the mobile device, indicating that the matched image is an image of the person; retrieving the information related to the identity of the person from a graph database, wherein the information is associated with the identifier of the matched image; and transmitting the information related to the identity of the person to the mobile device. The system further comprises the graph database, comprising: one or more person nodes; one or more image nodes associated with the one or more person nodes comprising image identifiers of associated images; and one or more relationships associated with at least one of the one or more person nodes, wherein the one or more relationships comprise at least part of the information related to the identity of the person. The system further comprises the facial recognition server, comprising a facial feature templates store and a facial recognition engine configured to: receive the at least one captured image from the server; extract facial feature template from the at least one captured image; match the extracted facial feature template with facial feature templates stored in the facial feature template store, wherein the matched facial feature template is associated with the image identifier of the matched image in the facial feature template store; and transmit the image identifier of the matched image to the server.

As described herein, a variety of other features and advantages can be incorporated into the technologies as desired.

BRIEF DESCRIPTION OF THE DRAWINGS

FIGS. 8A-B are diagrams depicting an example mobile device user interface comprising a cut-out for improving the accuracy of image capturing.

FIG. 18A is a diagram depicting an example mobile device user interface for verifying a potentially matched identity.

FIG. 18B is a diagram depicting an example mobile device user interface for viewing profile information for an identified person.

FIG. 18C is a diagram depicting an example mobile device user interface for obtaining profile information for a person.

FIG. 20A is a diagram depicting an example mobile device user interface for tracking a work schedule.

FIG. 20B is a diagram depicting an example mobile device user interface for tracking attendance information via a lock screen of a mobile device.

FIG. 20C is a diagram depicting an example mobile device user interface for tracking attendance information via a home screen of an application.

DETAILED DESCRIPTION

Example 1—Overview

Figure 1:
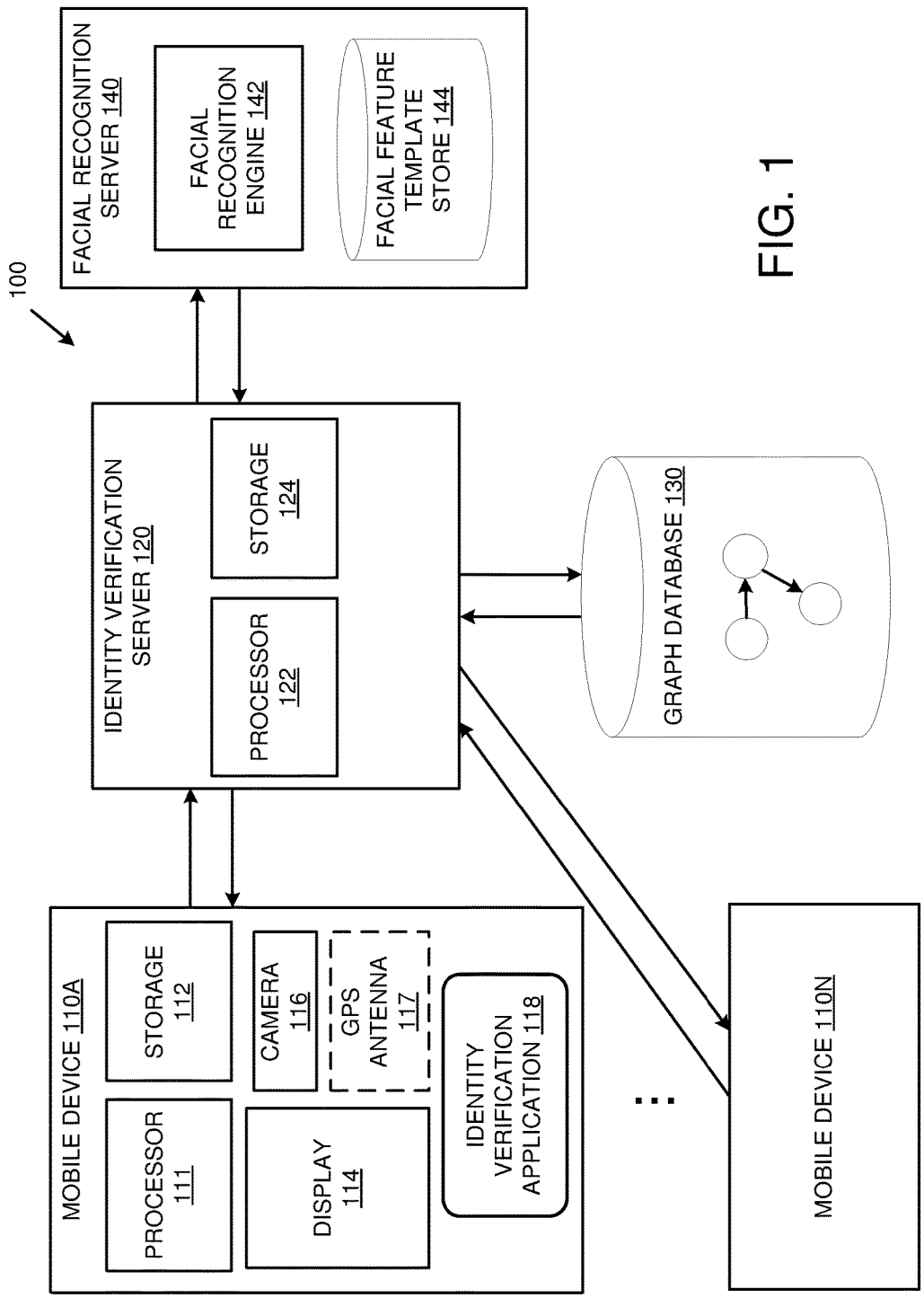
FIG. 1 is a block diagram depicting an example system for identity verification and tracking.

The following description is directed to technologies for identity verification and event correlation and association using facial recognition with a mobile device and a graph database. Typical systems for tracking information related to individuals rely on demographic information, such as names, government identity numbers, and/or dates of birth, to identify individuals. Such systems can be ineffective in cases where individuals are unwilling or unable to provide such demographic information, or provide false demographic information. At least some of the technologies described herein solve these problems by using facial recognition, mobile devices, and a graph database to verify identities of individuals and to track information related to the individuals.

Furthermore, improvements to typical facial recognition systems are provided herein. Typical facial recognition systems assume that images provided to them are legitimate. A malicious user who has access to upload images to such a system can upload fake images in an attempt to compromise the system. At least some of the technologies described herein address this problem by validating received images, for example, by verifying that an individual depicted in a captured image was physically present when the image was captured and/or determining whether multiple images are transmitted from a same location or geographic area.

As described herein, facial recognition can be used to identify an individual depicted in an image captured with a mobile device. A potential match image can be presented to a user of the mobile device for verification that the potential match image depicts the same person as the captured image. If the images are indicated as depicting the same person, profile information associated with the potential match image in a graph database can be retrieved and presented to the user via the mobile device. If the potential match image does not depict the same person as the captured image, the mobile device can be used to create and store profile information in association with the captured image in the graph database, which is added to a gallery for future recognition.

In some embodiments, the mobile device can be used to report information about events related to the individuals identified using the mobile device. The mobile device can receive notifications about events related to such identified individuals as well.

As described herein, an identity verification server can be used to identify individuals depicted in received images using facial recognition and to manage profile information and associations between identified individuals and individuals operating the mobile devices, in the graph database.

In some embodiments, the identity verification server can receive information about events related to the identified individuals, to track and correlate the events using the graph database, and to transmit event notifications to mobile devices associated with the identified individuals.

At least some of the technologies described herein can improve application performance by providing superior event correlation and reporting functionality. The performance of the computers used to correlate and report events can also be improved. Using a graph database, as described herein, to create and analyze associations between reported events and other entities can reduce the computation costs associated with event correlation and association.

Example 2—System for Identity Verification and Tracking

In any of the examples herein, a system can be provided for performing operations for identity verification and tracking using a mobile device with facial recognition and a graph database.

FIG. 1 is a block diagram depicting an example system 100 for identity verification and tracking. The system 100 comprises one or more mobile devices 110 (e.g., mobile devices 110A-N), an identity verification server 120, a facial recognition server 140, and a graph database 130.

The one or more mobile devices typically comprise processors, storages, displays, cameras, and identity verification applications. For example, the mobile device 110A comprises a processor 111, a storage 112, a display 114, a camera 116, and an identity verification application 118. All or part of the identify verification application 118 can be stored in the storage 112. Alternatively or additionally, all or part of the identity verification application 118 can be stored in a memory (not shown) of the mobile device 110A. The identity verification application can be executed by the processor 111 to perform identity verification operations.

In at least some embodiments, the one or more mobile device 110 comprise global positioning system (GPS) antennae. For example, the mobile device 110A optionally comprises GPS antenna 117.

The one or more mobile devices 110 can be configured to transmit messages to, and receive messages from, the identity verification server 120.

The identity verification server 120 comprises a processor 122 and a storage 124. The identity verification server 120 is configured to receive message from the mobile device 110A and transmit message to the mobile device 110A. In the example, the identity verification server 120 is configured to transmit messages to, and receive message from, the graph database 130 and the facial recognition server 140.

The example includes a graph database 130 that comprises data stored in one or more graph data structures, wherein a graph data structure comprises one or more nodes of data connected to one or more other nodes of data via relationships comprising data structures with defined relationship types. The graph database 130 can be configured to search the one or more graph data structures in response to received search requests and to return search results identifying nodes and/or relationships that match provided search criteria. The graph database 130 can be configured to process requests to create and/or update the one or more graph data structures by creating, updating, and/or deleting one or more nodes or relationships. The graph database 130 is configured to receive messages comprising such requests from the identity verification server 120 and to transmit messages comprising responses to the identity verification server 120.

The facial recognition server 140 is configured to identify faces in received images and to extract the identified facial features as mathematical representations called templates using a facial recognition engine 142 and to store the extracted facial feature template in a facial feature template store 144, which can serve as a gallery for facial recognition. In at least some embodiments, facial feature templates are extracted using facial feature models constructed from several face images. The facial recognition server can be configured to identify multiple images of a same or similar looking person by using the facial recognition engine 142 to compare the extracted facial feature template against the facial feature templates stored in the facial feature template store 144. The facial recognition server 140 is configured to receive messages comprising images from the identity verification server 120 and to transmit messages comprising search results to the identity verification server 120.

In any of the examples herein, the boundaries between components can vary while still implementing the technologies. For example, servers can be combined or separated, and features such as redundancy, load balancing, security, and the like can be incorporated. For example, the facial recognition engine 142 and/or the facial feature template store 144 can be included in the identity verification server 120 instead of the facial recognition server 140. In such an embodiment, the identity verification server 120 can access the facial recognition engine 142 and/or the facial feature template store 144 directly instead of transmitting messages to the facial recognition engine 140.

The system 100 and any of the other systems described herein can be implemented in conjunction with any of the hardware components described herein, such as the computing systems described below (e.g., processing units, memory, and the like). In any of the examples herein, the inputs, outputs, graphs, images, facial feature templates, requests, databases, and environments can be stored in one or more computer-readable storage media or computer-readable storage devices. The technologies described herein can be generic to the specifics of operating systems or hardware and can be applied in any variety of environments to take advantage of the described features.

Example 3—Methods for Identity Verification and Tracking

In any of the examples described herein, methods can be provided for identity verification and tracking.

Figure 2:
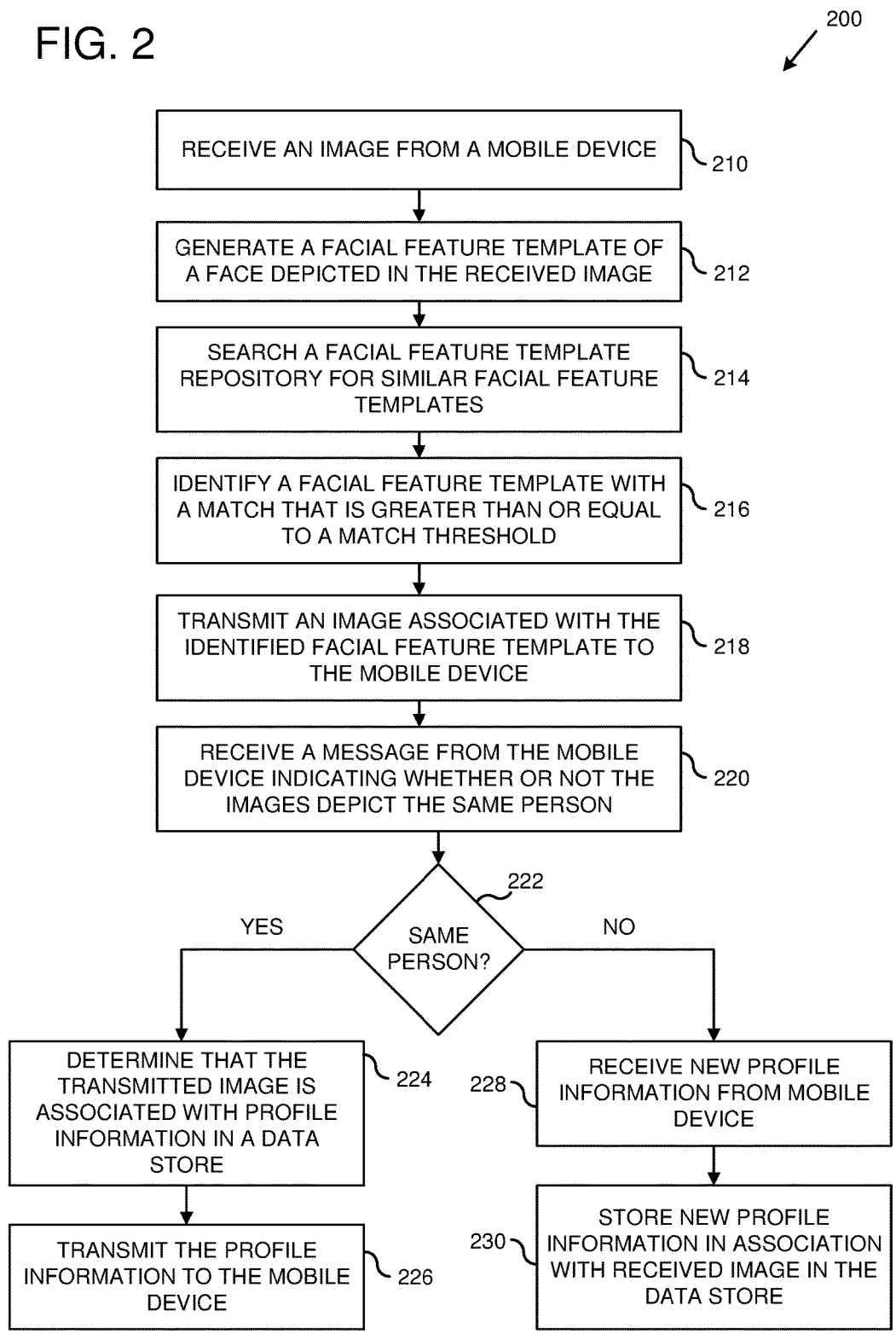
FIG. 2 is a flowchart depicting an example method for identity verification and profile creation using an identity verification server.

FIG. 2 is a flowchart depicting an example method 200 for identity verification and profile creation using an identity verification server and can be performed by one or more server computing systems as described herein. At 210, an image is received at the identity verification server from a mobile device. Such an image can serve as a probe that is checked against a stored gallery of face information. The image can be received directly from the mobile device. Alternatively, or additionally, the identity verification server can receive a unique identifier for the image, which the identity verification server can then use to retrieve the image from a separate storage location. In at least some embodiments, the identity verification server can determine whether the received image is valid before proceeding with the identity verification. Examples of image validation, discussed in more detail below, can include verifying that the image depicts a human face, that the image is of a sufficient resolution, and/or that the image was received from a legitimate source. As described herein, validation can also be performed on the client (e.g., mobile device) side.

At 212, a facial feature template of a face depicted in the received image is generated. The facial feature template can be constructed by extracting quantifiable values that represent the various facial features in the image. Example features can include eye shape, inter-pupillary distance, nose shape and/or size, ear shape, size, and/or location, mouth shape, size, location, face width-to-height ratio, etc. The various features can be identified using machine learning techniques, such as computer visualization. The quantifiable values can be combined to create a single facial feature template. Other techniques for generating the facial feature template are also possible.

At 214, a facial feature template store is searched to identify one or more similar facial feature templates. The facial feature template store can comprise facial feature templates generated based on one or more other images and can serve as a gallery against which probe faces are checked. In order to determine whether one or more previously stored templates are similar to the generated template, the quantifiable values in the generated template can be compared to values for corresponding facial features in the previously stored templates.

A measure of similarity can be determined by calculating differences between the templates to generate multiple facial feature similarity scores and aggregating the facial feature similarity scores to generate an overall similarity score. In at least some embodiments, the facial feature similarity scores can be adjusted using one or more specified weights. The specified weights can be selected based on one or more associated facial feature types. For example, human mouth is capable of a greater range of movement than, for example, the ears. Thus, given two images of a same person, it is statistically more likely that the facial features associated with the mouth in the respective images will have greater variability than the facial features associated with the ears. In such an example, a weight can be specified to adjust a facial feature similarity score for a facial feature associated with the mouth to account for such a variability. In at least one embodiment, weights associated with the various facial feature similarity scores can be dynamically adjusted in response to feedback. This can be done, for example, by a machine learning process, such as a neural network.

In a particular embodiment, a ratio of the area of a face in the image to a total area of the image can be adjusted to permit only face images captured by the camera of a mobile device. Additionally or alternatively, using feedback from a user of the mobile device, confidence levels for face detection can be adjusted. Other configurable parameters include acceptable limits on pitch and yaw of the face in the captured image. Captured face images can be converted to a color space for detecting and matching the facial features. Such a color space can be configured in the facial recognition engine.

At 216, a facial feature template with sufficient similarity to a facial feature template in the gallery is identified. For example, a template with a similarity score greater than or equal to a specified match threshold is identified. The specified match threshold can represent the confidence level for a minimum similarity for considering a previously stored facial feature template to be a representation of the same face as the generated facial feature template. The specified match threshold can be specified, for example, as a percentage (e.g., 95%). In scenarios where multiple stored facial feature templates have similarity scores greater than or equal to the match threshold, a facial feature template with the highest similarity score can be selected as the identified facial feature template. In at least some embodiments, the generated facial feature template is stored in the facial feature store for future searches even when a template with a similarity score above the threshold is not found.

At 218, an image associated with the identified feature template is transmitted to the mobile device. The image can be stored as a file and transmitted to the mobile device directly by the identity verification server. The identified facial feature template can be associated with a file identifier that can be used to retrieve the associated image. Alternatively or additionally, the identified facial feature template can be associated with a unique identifier, such as a uniform resource locator (URL), which identifies the associated image. In such a case, the identity verification server can transmit the unique identifier to the mobile device. The mobile device can then use the unique identifier to retrieve and display the associated image.

In practice, a user at the mobile device then examines the face of the displayed image to determine whether it depicts the person physically present at the mobile device. At 220, a message is received, at the identity verification server, from the mobile device, indicating whether or not the transmitted image depicts the same person as the image sent by the mobile device. At 222, the message is processed to determine whether the same person is depicted in both images.

If a determination is made at 222 that both images depict the same person, then at 224 it is determined that transmitted image is associated with profile information in a data store. The data store can be, for example, a graph database. In such an embodiment, the profile information can be stored in one or more nodes or relationships of the graph database.

The determination at 224 can be made by retrieving the profile information using a person identifier associated with the identified facial feature template and/or the associated image. At 226, the profile information is retrieved from the data store and transmitted to the mobile device. In at least one embodiment, transmitting the profile information to the mobile device at 226 can further comprise transmitting one or more images of identification documents, such as identification cards, associated with the profile information.

If it is determined at 222 that the images do not depict the same person, then at 228 new profile information is received from the mobile device. In at least some embodiments, the new profile information can comprise geolocation data of the mobile device at the time the image was captured. In practice, a user at the mobile device can enter in some or all of the profile information. The new profile information can be a part of the message that indicates whether or not the images depict the same person. In at least one embodiment, the presence of the new profile information can be detected at 222 as a part of the determination that the images do not depict the same person. Alternatively or additionally, all or part of the profile information can be received in one or more additional messages from the mobile device.

At 230, the new profile information is stored in the data store in association with the image received from the mobile device. In an embodiment where the data store is a graph database, storing the new profile information can comprise creating one or more new nodes and/or relationships in a graph data structure in the graph database. A node can be created for the photographed person. The node for the photographed person can comprise a unique identifier that can be used to locate the facial feature template in the facial feature template store and/or an identifier (such as a file path or URL) that can be used to locate the associated image. Additionally, one or more nodes and/or relationships can be created to store all or part of the new profile information.

The node for the photographed person can be associated with one or more of the nodes and/or relationships storing the profile information. For example, a relationship record can be created in the graph database to associate the node for the photographed person with one or more of the nodes storing the profile information. In at least one embodiment, the relationship record can have a relationship type that identifies the person node as comprising a profile image for the profile information.

Storing the new profile information at 230 can further comprise storing the facial feature template generated at 212 in association with the received image. For example the generated facial feature template can be stored in the facial feature template store (e.g., which serves as a gallery), where it can be compared to other facial feature templates as a part of one or more future searches. The stored facial feature template can be associated with an identifier that identifies a storage location of the received image. Additionally or alternatively, the stored facial feature template can be associated with an identifier for the node for the received image in the graph database. Such an identifier can be used to directly access the node for the received image.

In at least some embodiments, feedback that the image associated with the identified facial feature template did not depict the same person as the received image can be provided to the facial feature recognition engine. Such feedback can be used, for example, to adjust one or more weights associated with one or more facial features to improve the accuracy of future matches.

Storing the new profile information at 230 can further comprise receiving an image of an identification documents to be associated with the profile information. The image of the identification documents can be associated with the profile information in a similar manner as the received image. In an embodiment where a node is created for the identification document image in the graph database, the node can be associated with one or more nodes storing the profile information via a relationship record. The relationship record can indicate that the node for the identification document image comprises an image of an identification document associated with the profile information.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

Figure 3:
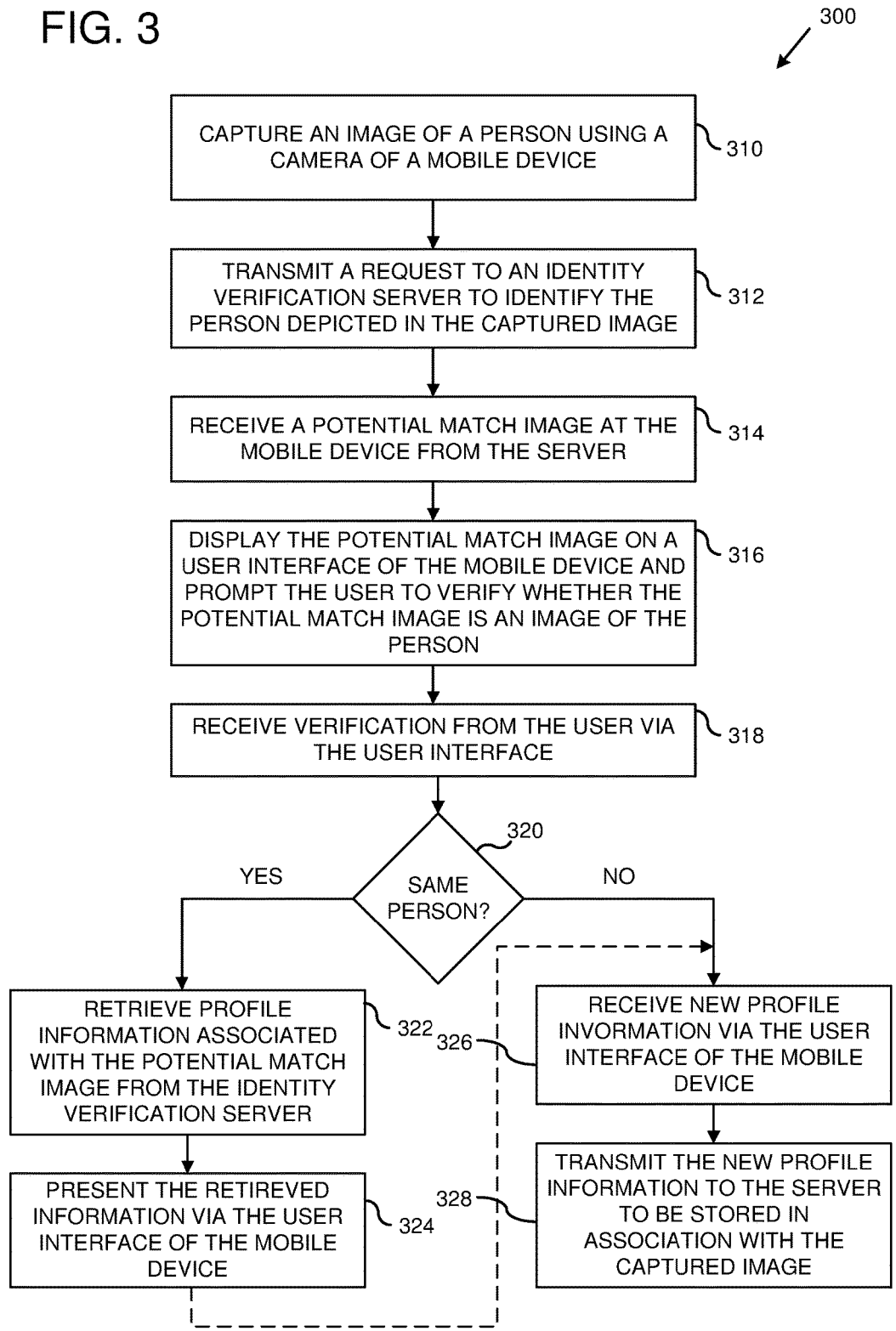
FIG. 3 is a flowchart depicting an example method for identity verification and profile creation using a mobile device.

FIG. 3 is a flowchart depicting an example method 300 for identity verification and profile creation using a mobile device and can be performed by a mobile device as described herein. In practice, the method 200 and the method 300 can work together in a single process from two different perspectives.

At 310, an image of a person is captured using a camera of a mobile device. The image can be captured, for example, by using an application programming interface (API) provided by an operating system of the mobile device. One or more commands exposed by the API can be used to activate the camera, receive an image from the camera, and save the image received from the camera to a storage or memory of the mobile device.

In some embodiments, the mobile device can comprise a viewfinder that can be used by a user of the mobile device to find the subject of the image to be captured. In other embodiments, one or more images can be received from the camera and presented to the user via a display of the mobile device in succession as a video stream. The image can be captured by receiving an input from the user that triggers a capture of the image. In at least some embodiments, the image can be captured automatically when facial features of a valid subject are detected, without additional input from the user. In a scenario where multiple images are presented to the user in succession as a video stream, the image can be captured by saving the most recently received image after receiving the input from the user, or as a video clip comprising several continuous frames. The input can be received via an interaction with a user interface component, such as a physical button of the mobile device and/or a logical button displayed on a touch screen of the user device. In at least some embodiments, the display of the user device can also be a touch screen.

At 312, a request is transmitted to an identity verification server to identify the person depicted in the captured image or video clip. In some embodiments, the request can comprise the captured image or video clip. Alternatively, or additionally, the captured image or video clip can be transmitted to a storage server and an identifier can be transmitted as part of the request that can be used by the image verification server to retrieve the captured image or video clip from the storage server.

At 314, a potential match image is received in response from the identity verification server. The potential match image can be received directly from the identity verification server. Alternatively or additionally, an identifier can be received from the identity verification server that can be used to retrieve the potential match image from a storage server.

At 316, the potential match image is displayed on a user interface of the mobile device. In at least some embodiments, the captured image is displayed on the user interface in addition to the potential match image. A prompt is displayed via the user interface as well, requesting that the user verify whether the potential match image is an image of the person. At 318, a verification is received from the user via the user interface, indicating whether the potential match image is an image of the person. At 320, the indication is processed to determine whether or not the potential match image is an image of the person.

If the potential match image is an image of the person, then at 322 profile information associated with the potential match image is retrieved from the identity verification server. A request can be transmitted to the identity verification server, requesting profile information associated with the potential match image. Optionally, an indication can be transmitted to the identity verification server, indicating that the potential match image is an image of the person. In at least one embodiment, retrieving the profile information for the person can comprise retrieving an image of an identification document of the person from the identity verification server. In such an embodiment, the retrieved image of the identification document can be displayed on the user interface of the mobile device.

In at least one embodiment, an image identifier for the potential match image is received from the identity verification server at 314. In such an embodiment, the image identifier can be transmitted to the identity verification server at 322 as part of the request for the profile information. In a different or further embodiment, a person identifier for a person depicted in the potential match image is received in addition to the potential match image at 314. In such an embodiment, the person identifier can be transmitted to the identity verification server as part of the request for profile information at 322.

At 324, all or part of the retrieved profile information is presented via the user interface of the mobile device.

If it is determined at 320 that the potential match image is not an image of the person, then at 326 new profile information is received via the user interface of the mobile device. The user interface can display one or more controls configured to receive profile information from the user. At 328, the new profile information comprising the information input by the user and/or other imputed information, such as geolocation and metadata, is transmitted to the identity verification server to be stored in association with the captured image.

Optionally, new profile information can be received via the user interface even if it is determined at 320 that the potential match image is an image of the person. The new profile information can be added to, merged with, and/or replace all or part of the retrieved profile information. The updated profile information can then be transmitted by the mobile device to the identity verification server.

In at least some embodiments, an image of an identification document of the person can be received via the user interface of the mobile device. The image of the identification document can be captured by the camera of the mobile device or obtained by some other means. The mobile device can transmit a message to the server comprising the image of the identification document to the server and a value indicating that the image is an image of the identification document for the person.

Figure 4:
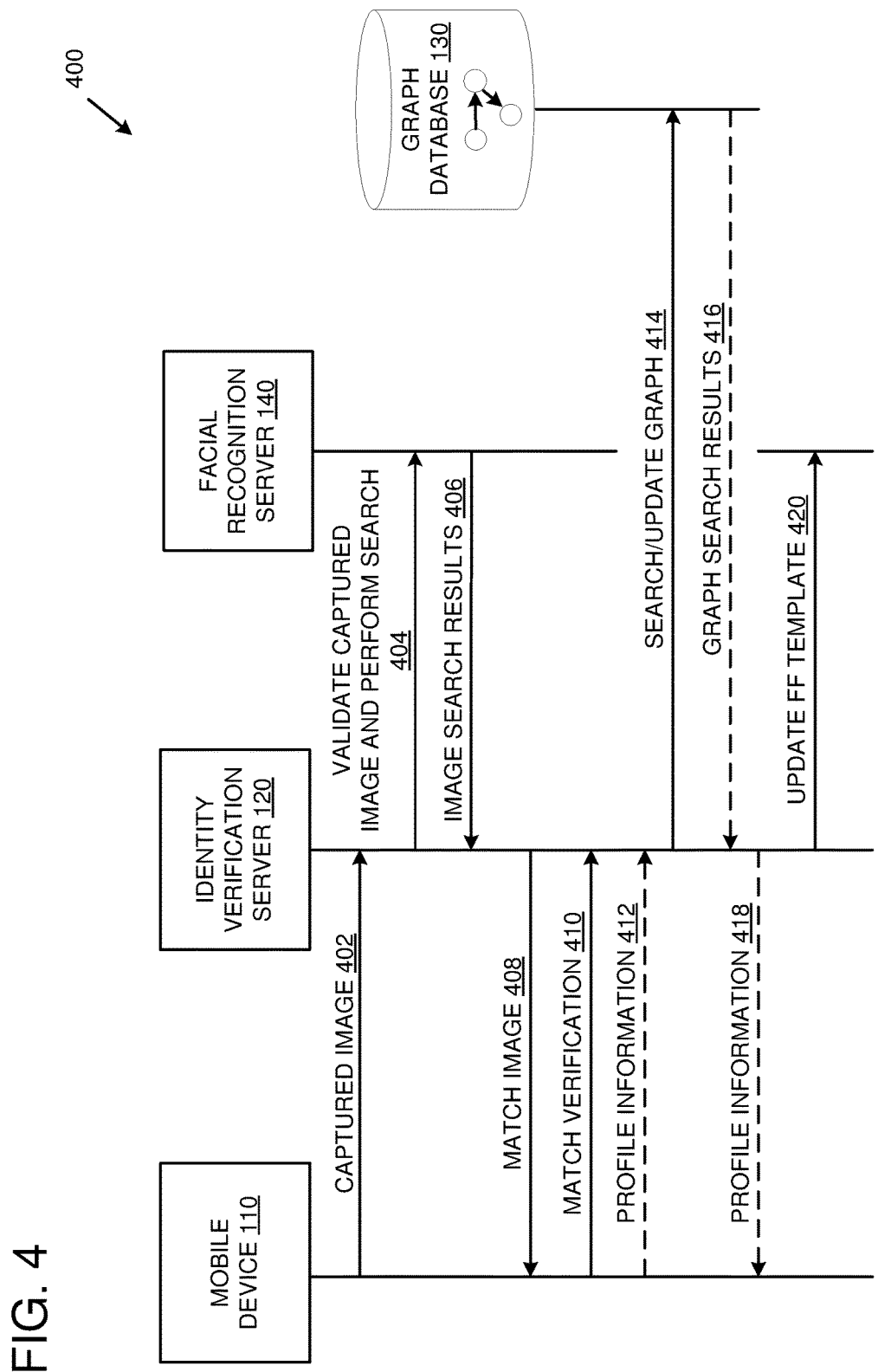
FIG. 4 is a sequence diagram depicting an example method for performing identity verification using a mobile device, a server, a facial recognition server, and a graph database.

FIG. 4 is a sequence diagram depicting an example method 400 for performing identity verification using one of the mobile devices 110, the identity verification server 120, the facial recognition server 140, and the graph database 130.

A captured image 402 is transmitted from one of the mobile devices 110 to the identity verification server 120. The captured image 402 is received by the identity verification server 120, where the legitimacy and trust score of the user of the mobile device 110 is verified.

The captured image 402 is transmitted from the identity verification server 120 to the facial recognition server 140 as part of a request 404 to validate the captured image and perform a search for matching facial feature templates. The facial recognition server 140 generates a facial feature template from the captured image 402 and validates captured image 402. As discussed in more detail in Example 4 below, the validation can comprise determining whether the captured image is legitimate (e.g., not from a malicious user), that the captured image depicts a human face, that the subject in the captured image 402 was physically present when the image was captured, and/or that the face depicted by the captured image is positioned appropriately within the captured image. Validation can occur immediately or be deferred for later determination. For example, validation can filter incoming probe images, filter facial representations in the repository to remove them from a gallery, or both.

Once validated, the facial recognition server 140 uses the validated captured image to search a facial feature template store to identify one or more previously stored templates that may depict the same person as the validated captured image.

The facial feature recognition server 140 then transmits search results 406, comprising image identifiers and similarity scores for any images that were identified as potentially depicting the same person as the validated captured image, to the identity verification server 120.

The identity verification server 120 analyzes the search results to identify a potential match image to transmit to the mobile device for verification. If more than one search result is returned in the image search results 406, then the identity verification server 120 can identify a best match using the similarity scores. Once a potential match result has been determined, the image identifier associated with the potential match result can be used to locate the potential match image 408. The identity verification server 120 then transmits the potential match image 408 to the one of the mobile devices 110. Alternatively, a plurality of candidate matches can be processed serially (e.g., one image is presented after the other for verification), or in parallel (e.g., more than one image is presented for verification).

The one of the mobile device 110 then transmits a match verification 410 to the identity verification server 120. The match verification 410 indicates whether or not the potential match image 408 depicts the same person as the captured image 402. If the potential match image 408 does not depict the same person as the captured image 402, then the one of the mobile device 110 also transmits profile information 412 to the identity verification server 120.

The identity verification server transmits a search or update command to the graph database 130, depending on whether the match verification 410 indicates that the potential match image 408 does or does not depict the same person as the captured image 402. If the potential match image 408 does depict the same person as the captured image 402, then the command 414 is a command to search a graph data structure for one or more nodes associated with the potential match image 408. For example, the command 414 can comprise an identifier for the potential match image 408 and a query for one or more nodes connected by relationships to an image node associated with the image identifier. If the potential match image 408 does not depict the same person as the captured image 402, then the command 414 is a command to update the graph data structure by creating one or more nodes and/or relationships in the graph data structure to store the profile information 412, creating an image node to store an image identifier for the captured image 402, and associating the created image node with the one or more created nodes storing the profile information 412 with one or more relationship records.

If the command 414 is a command to search the graph data structure, then the graph database 130 transmits graph search results 416, comprising data stored in one or more of the requested nodes and/or relationships, to the identity verification server 120 after completing the search. The identity verification server 120 processes the search results to extract profile information 418 from the graph search results 416 and transmits the profile information 418 to the mobile device 110.

The identity verification server 120 then transmits a command 420 to update facial feature template to the facial recognition server 140. The command 420 comprises instructions to store the generated facial feature metadata in the facial feature metadata repository in association with the captured image 408. If the potential match image 408 does depict the same person as the captured image 402, then the command 420 comprises feedback that the identified match was correct. If the potential match image 408 does not depict the same person as the captured image 402, then the command 420 comprises feedback that the identified match was not correct.

Example 4—Image Validation

In any of the examples described herein, various methods can be provided for image validation, whether the image is serving as a probe image or gallery image. Such validation can improve the quality of data incorporated into the system, filter incoming requests, or the like. As a result, more accurate facial recognition and profile data can be provided by the system.

One possible source of noise is a group of one or more users who attempt to manipulate the system by adding spurious images to the system. For example, a group may wish to skew results, generate favorable profiles, erode confidence in the system, or the like. Various techniques herein can be used to detect and filter such data from the system.

Figure 5:
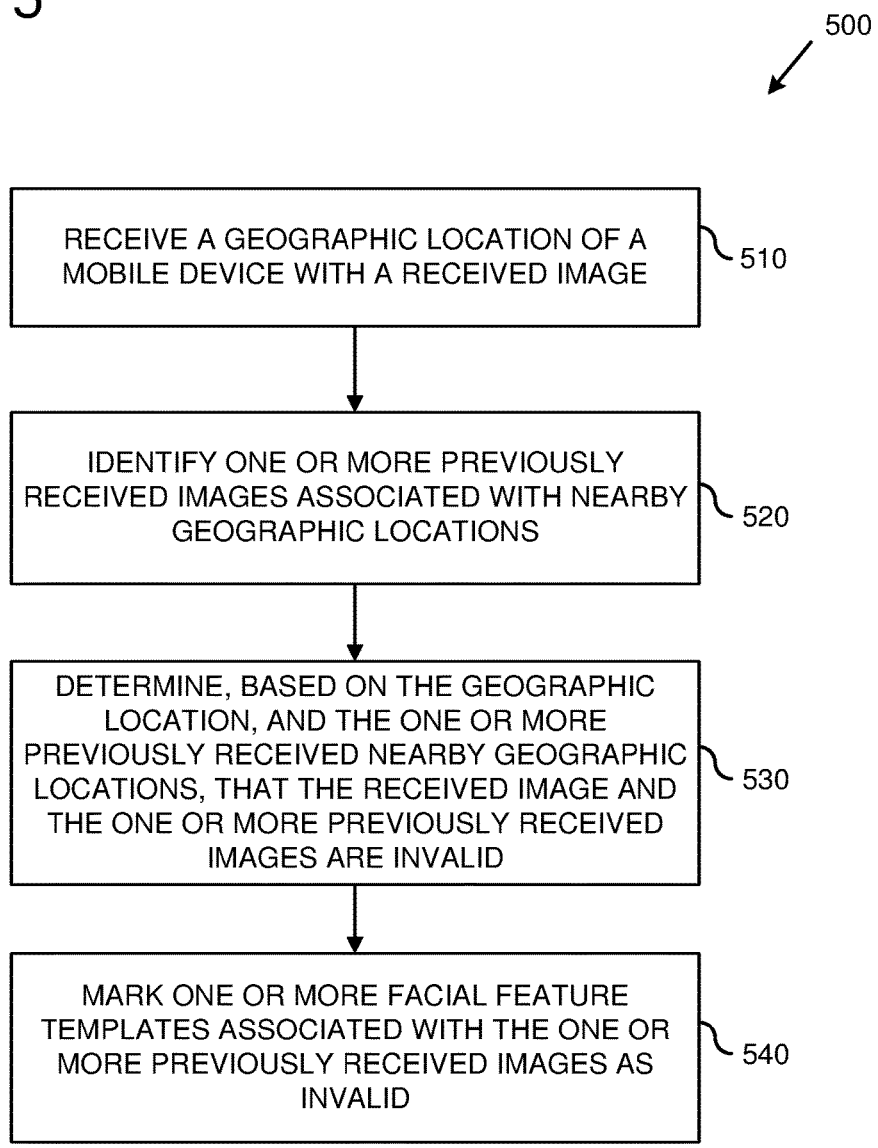
FIG. 5 is a flowchart depicting an example method for validating images received by an identity validation server.

FIG. 5 is a flowchart depicting an example method 500 for validating images received by an identity validation server using geographic locations. The method 500 can be performed in real-time (e.g., when the image is received from a mobile device) or periodically run against the repository (e.g., during low activity time periods to avoid performance degradation).

At 510, a geographic location of a mobile device is received with a received image that was captured by the mobile device. The geographic location can be a geographic location of the mobile device at the time the received image was captured by the mobile device. Alternatively, the geographic location can be a different location associated with the mobile device, such as a location of a primary residence or primary place of business of an owner of the mobile device.

The geographic location can comprise a set of coordinates, such as latitude and longitude coordinates. Such coordinates can be global positioning system (GPS) coordinates captured by the mobile device using a GPS antenna. The geographic location, alternatively or additionally, can comprise an address for the location, such as a mailing address.

At 520, one or more previously received images associated with nearby geographic locations are identified. Records for previously received images can be stored in a data store. For example, nodes that represent the images can be created in a graph database. The records or nodes can store identifiers for the previously received images in association with geographic locations received with the previously received images.

The determination that a geographic location is nearby to the received geographic location can be based on a number of factors. In embodiments where the geographic locations comprise sets of coordinates, the determination can be based on a degree of separation between the coordinates for the received image and the coordinates for a previously received image. For example, a radius can be specified that, in combination with the set of coordinates for the received image as a center point, defines a circular area around the received geographic location. If a set of coordinates for a previously received image lies within the circular area, the geographic location of the previously received image can be determined to be nearby to the geographic location of the received image.

The identification of nearby geographic locations can comprise a search of the data store or graphical database for records or nodes associated with geographic locations that satisfy the criteria for being a nearby location. In embodiments where the geographic locations comprise sets of coordinates, the sets of coordinates can be stored in a spatial database. Storing the sets of coordinates in a spatial database can, in some cases, make the search for nearby geographic locations more efficient.

At 530, it is determined, based on the received geographic location and the one or more previously received nearby geographic locations, that the received image and the one or more previously received images are invalid. Various criteria for determining that the images are invalid can be used, depending on the context in which the images are being validated. Internally, the determination can be made by identifying a geographically-based suspect data condition based on the geographic locations of the images and, responsive to identifying the condition, it can be determined that the images are invalid. A suspect data condition does not necessarily result in invalidation of all of the involved images. For example, some images may originate from a user identifier that is designated as a trusted partner that is immune to invalidation.

In at least one embodiment, trust scores can be assigned to mobile devices that indicate levels of trustworthiness for images received from the mobile devices. A trust score can comprise one or more factors.

A first example factor is a standard deviation of the frequency and number of face images captured by the mobile device. If the difference in the frequency and number of face images captured by the mobile device is statistically significant, a negative score is applied to the overall trust score of that mobile device.

The second example factor that can be used, in isolation or in conjunction with the first example factor, is a geolocation density of some of the mobile devices. For example, if a cohort consisting of two or more mobile devices capture face images from a statistically significant geolocation density, as compared to the immediate population, a negative score is applied to the overall trust score of the mobile devices in that cohort. Geolocation density can be calculated using two-dimensional Cartesian coordinates obtained from the GPS's of the mobile devices or by optionally combining two-dimensional Cartesian coordinates with altitude data captured from the barometric readings of the mobile devices. Such barometric data may be obtained via APIs available on at least some mobile devices.

A third example factor is a history of attempting to transmit invalid face images, including images of non-facial or inanimate objects or face images captured from another photograph or video, by the mobile device. If a mobile device has a history of transmitting invalid images, the trustworthiness of any future images received from that mobile device is reduced.

Further, to prevent false positives, images can be provisionally marked as invalid, and confirmation can be later received to confirm invalidity or override the suspect data condition. For example, images either marked either as invalid, or coming from a device with a low trust score, can be quarantined and a final determination of their validity or invalidity can be made offline.

In at least one embodiment, a restriction can be defined that limits the number of images that can be received from a single location. In such an embodiment, two geographic locations can be determined to be nearby to one another if they are in very close proximity to one another. For example, a radius can be defined and applied, such that geographic locations within the radius are likely to be within a same building. If the received image and the one or more previously received nearby images, in combination, total more than a maximum number of images that can be received from a single location, one or more of the images can be determined to involve a geographically-based suspect data condition and therefore be invalid.

In a different or further embodiment, the criteria can comprise a restriction that limits the number of images that can be received from a single location in a given period of time. For example, a time at which an image is received can be stored in association with the geographic location of the image. Such a time period can be defined as a number of minutes, hours, days, years, etc. The one or more identified previously received images with nearby geographic locations can be filtered to remove any images that were received outside of the time period. If any remaining previously received images, in combination with the received image, total more than a maximum number of images that can be received from a single location in the specified time period, one or more of the images can be determined to be invalid.

In at least some embodiments, the images are received as part of requests for identity verification and tracking. In scenarios where existing matching pre-existing images are not found, profile information can be received from the mobile device and stored in association with a received image. It is possible, in such an embodiment, that a user of the mobile device could attempt to transmit multiple images depicting different people and submit fake profile information to be stored in association with transmitted images. Example method 500 can be used to detect this malicious activity by determining at 530 that the images depicting the different people were all received from geographic locations in close proximity to one another.

At 540, one or more facial feature templates associated with the one or more previously received images are marked as invalid. Facial feature templates can be generated based on received images and used to identify images that depict the same person. A facial feature template generated based on the received image can be compared to stored facial feature templates in a facial feature template store for previously received images to determine whether one or more of the previously received images depict a same person as the received image. However, if a facial feature template is marked as invalid, it can be omitted from a search of the facial feature template repository. Alternatively or additionally, facial feature templates marked as invalid can be deleted from the facial feature template store. Provisionally invalid templates can be excluded until confirmation is received that the template is authentic, at which point they are added or reintroduced into the store.

Marking the facial feature templates associated with the previously received images instead of deleting profile information associated with the images can be advantageous in certain circumstances. For example, a user who has maliciously uploaded images of multiple people and created fake profile information for the images will still be able to view the fake profile information via the user's mobile device. However, when other users who upload legitimate images of the same people, the legitimate images will not match the invalid images in a facial recognition search. Thus, the malicious user may continue to believe that the attack has succeeded, when in fact it has been detected and mitigated.

It is possible to detect that multiple images have been received from a same mobile device or application instance as well. Detecting that multiple images have been received from a same mobile device can be used, in at least some cases, to determine that one or more of the images received from the same mobile device are invalid. However, in some cases, using geographic locations can be advantageous in detecting when multiple images are received from a same location. For example, a user may use multiple mobile devices to transmit images from a single location. Similarly, multiple users with separate mobile devices may be working together in a single location to circumvent a limit on image transmissions. Also, in some cases it may be desirable to limit received images based on location and not mobile device. For example, an employer may employ multiple employees at more than one location. The employer could use a single mobile device to transmit images of prospective employees from the multiple locations. Limiting a number images that can be transmitted from a given mobile device would not be effective in such a scenario.

Another set of techniques involves validating that a facial image was captured when the subject was physically present.

Figure 6:
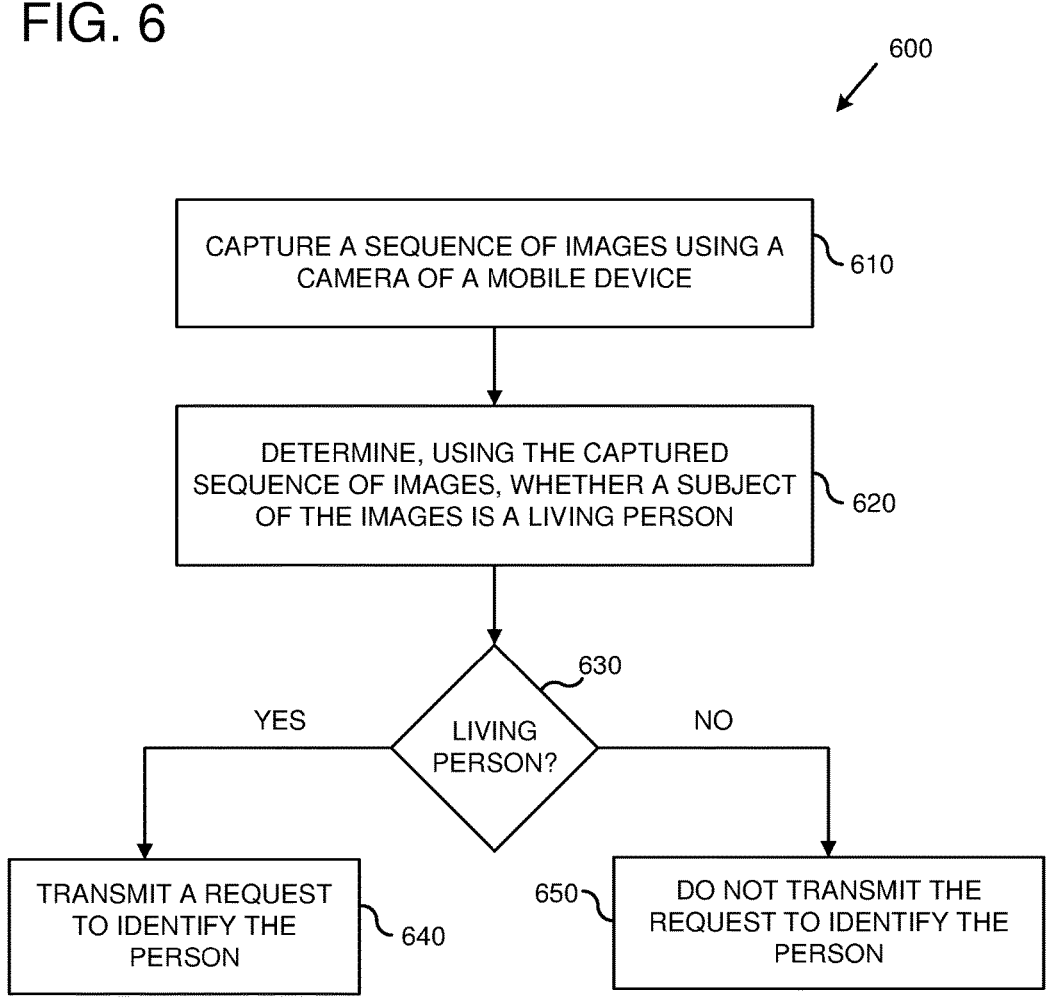
FIG. 6 is a flowchart depicting an example method for validating images captured at a mobile device.

FIG. 6 is a flowchart depicting an example method 600 for validating images captured at a mobile device. In some cases, that a user may try to upload an image of a picture of a person instead of an image of a person who is physically present at the mobile device. A malicious user may do this, for example, to obtain profile information, or create fake profile information, for a person who is not physically present and consenting to have his or her identity verified.

At 610, a sequence of images is captured using a camera of a mobile device. An identity verification application running on the mobile device can do this, for example, by using an API of the mobile device to obtain a video sequence from the camera. In such an embodiment, the individual frames in the video sequence can be treated as the sequence of images. In different or further embodiment, the identity verification application can quickly capture multiple images using the camera when the user thinks that only a single image is being captured.

Alternatively, the identity verification application can prompt the user to capture the multiple images. For example, the identity verification application can prompt the user to capture multiple images of the person from multiple angles, such as directly facing the camera, in left profile, and/or in right profile, etc.

Some mobile devices have more than one camera that are configured to capture stereoscopic images. If the mobile device is such a device, the stereoscopic image captured using the multiple cameras can be used as the sequence of images.

At 620, it is determined, using the captured sequence of images, whether a subject of the images is a person who was physically present at the mobile device when the sequence of images were captured. In an embodiment where the sequence of images is captured as a video sequence or the images are captured in rapid succession, the determination can comprise identifying one or more variations in the sequence of images that indicates one or more facial movements. For example, the one or more variations can indicate one or more of an eye movement, an eyelid movement, a head movement, etc. In a particular example, eyes tend to have a greater range of motion relative to a forehead of a person. If a delta between the ranges of motion for the eyes and the forehead drops below a specified threshold, captured sequence of images can be deemed suspicious. Such variations can be detected, for example, using a facial recognition engine employing machine learning techniques, such as computer visualization.

In at least one embodiment, various focal points in the sequence of images can be analyzed to determine whether the subject of the sequence of images is a person or a picture of a person. For example, a focal length of the mobile device camera can be rapidly altered for each image in the sequence of images. The sequence of images can then analyzed by calculating the relative depth of certain features compared to other features. For example, the earlobes should have a have greater depth than the tip of the nose since the nose is closer to the camera than the ears. If the earlobes do not have a greater depth than the tip of the nose, then the subject of the sequence of images is likely a picture of a person and not an actual person.

In an embodiment where the identity verification application prompts the user to capture multiple images of the person from different viewpoints, it is likely that a malicious user will not have access to multiple pictures of the person from all the requested viewpoints. The user may attempt to capture multiple images of the same picture. The identity verification application can use facial recognition techniques to determine whether a captured image, in fact, depicts an image of a person from the requested viewpoint. For example, using facial recognition techniques, the application can determine whether a captured image depicts a human face facing the camera, in left profile, in right profile, etc. Machine learning can be used to create models of human faces facing in the various viewpoints. A model for a given viewpoint can be used to validate an image purporting be an image of a human face captured from the given viewpoint.

In an embodiment where the captured sequence of images is a stereoscopic image captured using multiple cameras of the mobile device, the stereoscopic image can be analyzed to determine whether the image is of a human face or of a picture of a human face. The stereoscopic image comprises two images captured from slightly different angles. Differences between the two images can be identified that indicate that the subject of the image has depth, as does a three dimensional human head, or is flat. This determination, in combination with a determination as to whether both captured images depict human face, can be used to ascertain whether the stereoscopic image depicts a person and not a picture of the person.

If it is determined at 630, that the captured sequence of images depict a person who was physically present at the mobile device when the sequence of images were captured by the mobile device, then at 640 a request to identify the person, comprising one or more of the captured images, is transmitted to an identity verification server. However, if it is determined at 630 that the captured sequence of images do not depict a person who was physically present at the mobile device when the sequence of images were captured, then at 650 the request to identify the person is not transmitted. Optionally, a message can be displayed by the identity verification application to let the user know that the captured images do not depict a valid subject and/or that only images of living people are allowed. Alternatively, a message can optionally displayed that tells the user that no matches for the captured image were found. In a different or further embodiment, images that are determined to be invalid can be quarantined for further review. The mobile device and/or user that captured an invalid face image can be assigned a negative trust score. Such a trust score can be used to determine whether subsequent images received from the mobile device and/or user are trustworthy.

Figure 7:
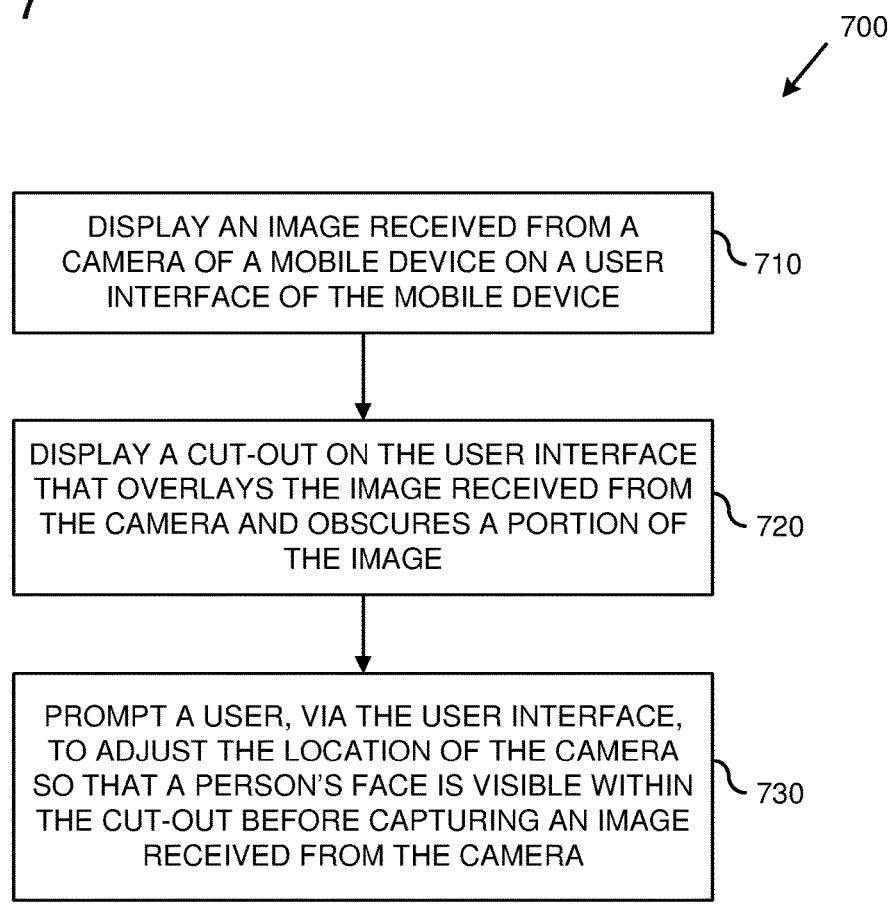
FIG. 7 is a flowchart depicting an example method for improving the accuracy of image capturing using a mobile device.

FIG. 7 is a flowchart depicting an example method 700 for improving the accuracy of an image captured using a camera of a mobile device. In some cases, for images to be accurately matched using facial recognition, it can be useful for the images to depict faces in a consistent manner. For instance, in some cases it can be difficult to reliably match images when the images depict faces at different angles, in different positions, at different distances, with different resolutions, etc. Example method 700 can be used, at least in some cases, to improve the accuracy of facial recognition by promoting consistency among captured images.

At 710, an image from a camera of a mobile device is displayed on a user interface of the mobile device. The image can be one of multiple images received from the camera and displayed on the user interface in sequence. In such a scenario, the sequence of images can be presented via the user interface as a video feed to the user. As the user adjusts the position of the camera, the view displayed on the user interface via the sequence of images will change accordingly.

At 720, a cut-out is displayed on the user interface that overlays the image received from the camera and obscures a portion of the image. The cut-out can take various shapes, such as a rectangle, circle, etc. In some embodiments, the cut-out can be in the shape of an outline of a human head. By obscuring portions of the image not visible within the cut-out, the cut-out can serve as a guide for correctly positioning a face of a person depicted in the image.

FIG. 8A depicts an example user interface 832 displayed on a display 830 of an example mobile device 810. The user interface 832 comprises an example cut-out 834 overlaying an image captured by a camera 840 of the mobile device 810. The camera 840 is illustrated as being positioned on the back of the mobile device 810, but other positions for the camera are also possible. The image captured by the camera 840 depicts a face 850.

Returning to FIG. 7, at 730, a user is prompted, via the user interface, to adjust the location of the camera so that the person's face is visible within the cut-out before capturing an image received from the camera. In some embodiments, the prompt can be one or more messages displayed to on the user interface to direct the user to place the face of the person within the cut-out. In a further embodiment, the message displayed may be in reaction to detecting a position of the face of the person within the image. For example, based on a detected position of the face within the image, the message can prompt the user to move forward, move backward, move left, move right, etc. In a different or further embodiment, the size and shape of the cut-out can serve as the prompt.

For example, in FIG. 8B, the size and shape of cut-out 834 have server to prompt the user to adjust the position of the camera 840 so that the face 850 completely fills the cut-out 834. Once the face 850 is appropriately positioned within the cut-out 834, the user can capture the image by activating the button 836.

Other techniques for improving the accuracy of captured images are also possible. For example, visual cues such as guidelines and/or bounding boxes can be displayed on a user interface overlaying a captured image with prompts to align a face depicted in the image to the guidelines and/or bounding boxes. In a particular example, a horizontal line can be drawn on the user interface with a prompt to positioning the camera such that the eyes of the face are bisected by the horizontal line. Similarly, a bounding box can be displayed on the user interface with instructions to position the face within the box. However, a potential drawback to such techniques is that, since no portion of the received image is obscured, a user who does not understand the instructions may disregard the guidelines and/or bounding boxes and assume that, because the face is visible within the image that it is acceptable. An advantage of using a cut-out is that, in such a scenario, the user may naturally focus on ensuring that the face is visible within the cut-out before capturing the image.

It is possible that a user of a mobile device may attempt to submit requests for identity verification using images that do not depict human faces. This may be done, for example, as part of a malicious attempt to skew the accuracy of the identity verification process. In any of the examples described herein, an image can be analyzed to determine whether the image depicts a human face before a facial recognition engine is used to attempt to identify facial features in the image. Such an analysis can be performed on an image received at an identity verification server using a facial recognition engine as a preliminary step before attempting to use the facial recognition engine to generate facial feature metadata based on the image. Alternatively or additionally, such an analysis can be performed on a captured image by an identity verification application running on the mobile device before the captured image is transmitted to the identity verification server. If it is determined that the analyzed image does not depict a human face, a message can be transmitted by the identity verification server (and/or presented by the identity verification application on the mobile device) that no matches for the received or captured image were found.

Example 5—Example Profile Information

In any of the examples described herein, profile information can comprise one or more data pertaining to a person. Profile information can include demographic information, such as a name, address, identification number (such as a social security number, driver license number, or other government identity number), etc. The profile information can comprise contact information for the person, such as a phone number, email address, etc. The profile information can include information about one or more skills and/or one or more occupations of the person. The profile information can include information about a work schedule of the person, attendance reports for the person, reports regarding workplace incidents in which the person was involved, etc. The profile information can include one or more ratings and/or one or more reviews of the person. These examples are provided for illustration; other types of data can be included in the profile information as well.

Example 6—Example Graph Database

In any of the examples described herein, a graph database can be a server configured to store and manage data in one or more graph data structures. A graph database can also be a process running on a server or running on a virtual machine in a virtualized computing environment with access to virtualized hardware. In some embodiments, the graph database is referred to as a system of record or a data store.

In practice, the graph database can take the form of a plurality of processes that share responsibility for maintaining the graph data structures.

Example 7—Example Graph Data Structure

In any of the examples described herein, a graph data structure can be defined within a graph database for storing received image nodes in association with nodes storing profile information. A graph data structure can also be used to store person nodes in association with profile information and in association with other person nodes.

Figure 9:
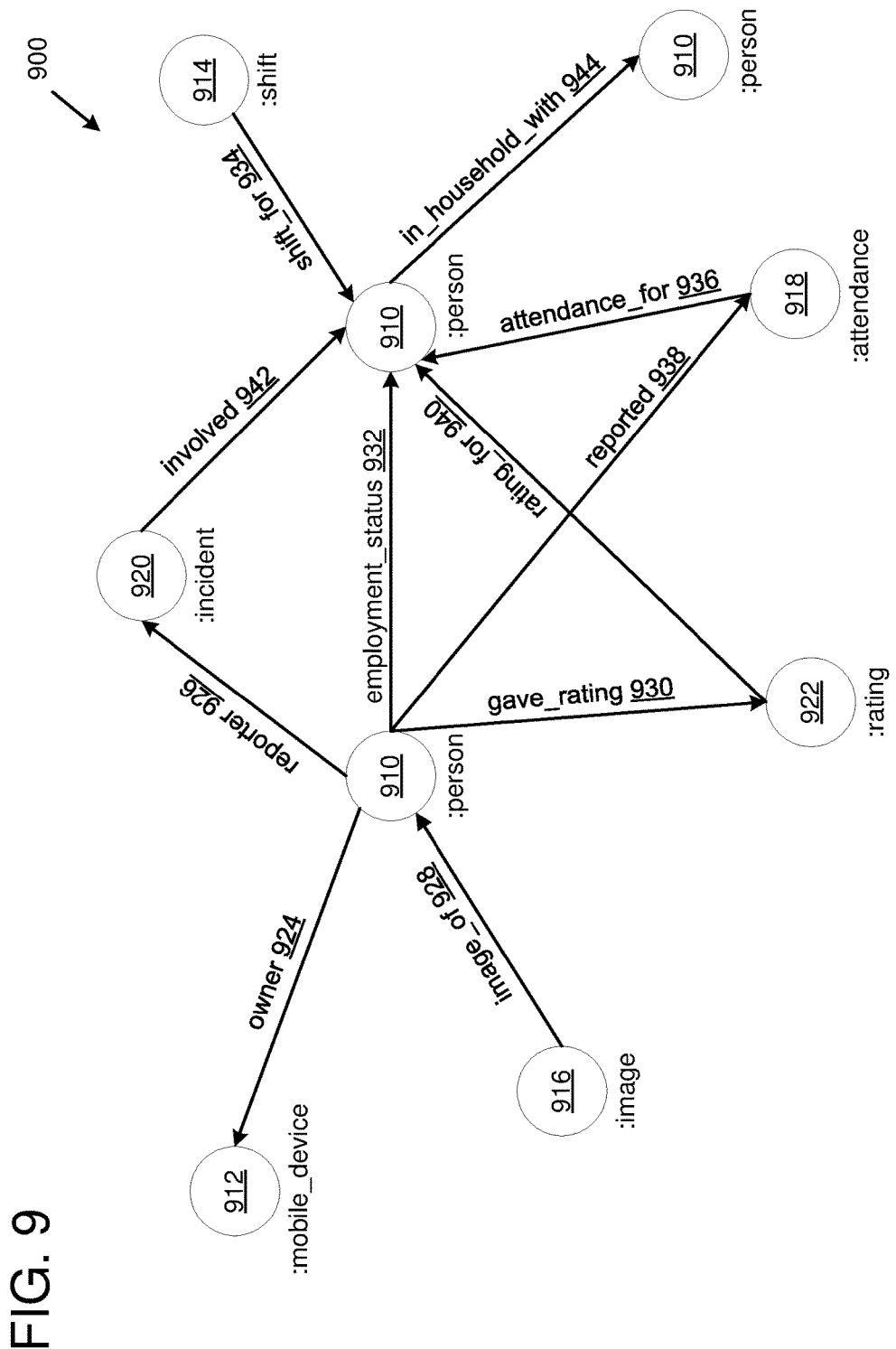
FIG. 9 is a data structure diagram depicting an example graph data structure schema for use in verifying identity.

FIG. 9 is a data structure diagram depicting an example graph data structure schema 900 for use in verifying identities and tracking profile information. The example schema 900 comprises a person node type 910 associated by multiple relationships with various other node types storing example profile information (e.g., attendance node type 918, rating node type 922, shift node type 914, and incident node type 920). The person node type 910 is also associated with other node types by various relationships (e.g., image node type 916, mobile_device type 912).

The person node type 910 is also associated with itself by various relationships (e.g., relationships with relationship types employment_status 932 and in_household_with 944). The person node type 910 is illustrated multiple times in FIG. 9 to make these relationships easier to understand; however, a single person node type 910 is defined in the example schema 900.

A node of the person type 910 can store information about a person, such as demographic information, one or more addresses, a geographic location of the person, etc.

A node of the mobile_device type 912 can store information that uniquely identifies a mobile device, such as a mobile phone number, a unique token issued to the mobile device, a media access control (MAC) address of the mobile device, etc. A node of the mobile_device type 912 can be associated with a node of the person node type 910 by a relationship of relationship type owner 924, which indicates that the person is an owner of the mobile device.

A node of the type image 916 can store information that identifies an image, such as a unique identifier, a file location where the image is stored, a URL that can be used to retrieve the image, etc. A node of the image type 916 can be associated with a node of the person type 910 by a relationship of type image_of 928 which indicates that the image is an image of the person.

A node of type rating 922 can store comments and/or one or more rating values. The one or more rating values can be associated with one or more categories. An overall rating value can also be stored. In some embodiments, the overall rating is computed based on the one or more category rating values. A node of type rating 922 can be associated with a node of type person 910 by a relationship of type gave_rating 930 which indicates that the person created the one or more rating values stored in the node of type rating 922. A node of type rating 922 can also be associated with a node of type person 910 by a relationship of type rating_for 940 which indicates that the rating applies to the person.

A node of type shift 914 can store information pertaining to a work shift, such as days and/or times that the work shift takes place. A node of type shift 914 can be associated with a node of type person 910 which indicates that the work shift is worked by the person.

A node of type attendance 918 can store information pertaining to attendance. The attendance can be for a particular event or for a series of events. In some embodiments, the attendance applies to a particular shift represented by a node of type shift 914. In such an embodiment, an identifier for the associated node of type shift 914 can be stored in the node of type attendance 918. A node of type attendance 918 can be associated with a node of type person 910 by a relationship of type reported 938 which indicates that the attendance information was reported by the person. A node of type attendance 918 can also be associated with a node of type person 910 by a relationship of type attendance_for 936 which indicates that the reported attendance information applies to the person.

A node of type incident 920 can store information related to an incident, such as a criminal incident or an accident, that has occurred. Such information can comprise a type of the incident (e.g., burglary, assault, kidnapping, theft, accident, property damage, missing item, etc.), a date and/or time that the incident occurred, whether or not a police report was filed, and/or comments related to the event. A node of the type incident 920 can be associated to a node of type person 910 by a relationship of type reporter 926 which indicates that incident was reported by the person. A node of the type incident 920 can also be associated to a node of type person 910 by a relationship of type involved 942 which indicates that the person was involved in the incident.

A node of type person 910 can be related to another node of type person 910 by a relationship of type employment_status 932, which indicates that the person has an employer/employee relationship with the another person. The relationship of type employment_status 932 can store information pertaining to the employment relationship. For example, the information stored in the relationship can comprise whether the another person is an employee or prospective employee of the person, whether the employee is a live-in or shift employee, the duration of the employment, the duties performed by the employee for the employer, a date and/or time that the employer interviewed the employee, etc.

A node of type person 910 can be related to another node of type person 910 by a relationship of type in_household_with 944 which indicates that the person and the another person are members of a same household.

Example schema 900 is provided for illustration. Graph data structures using additional and/or alternative schemas can also be used as a part of the technologies described herein.

Example 8—Example Mobile Device

In any of the examples described herein, a mobile device can be a portable computing device configured to communicate over one or more wireless communication channels. A mobile device can be referred to as a mobile computing device. The mobile device comprises one or more processors and a storage. The mobile device can comprise a memory, a camera, a barometer, one or more wireless communication antennae, such as one or more a radio frequency antennae. Examples of possible wireless communication antennae include cellular antennae, Wi-Fi antennae, and GPS antennae. The mobile device can comprise a display, such as a screen, projection, speaker, haptic feedback device, etc., configured to present information to a user. The mobile device can comprise one or more user interfaces configured to receive input from the user. Example user interface include keypads, touchscreens, microphones, motion sensors, positional sensors, cameras, etc. The mobile device can be configured to use the one or more processors to execute one or more programs, such as applications.

Example 9—Identity Verification Application

In any of the examples described herein, an identity verification application can be a computer program comprising instructions that, when executed by a computer, such as a mobile device, cause the computer to perform operations for identity verification, event reporting, and/or event notification as described herein. In a different or further embodiment, the identity verification application can comprise a firmware and/or one or more application-specific integrated circuits (ASICs) configured to perform operations for identity verification, event reporting, and/or event notification as described herein.

Example 10—Example Identity Verification Server

In any of the examples described herein, an identity verification server can be a server computer configured to communicate with one or more mobile devices over one or more communication channels. The one or more communication channels can include wired communication channels, such as a wired network or direct wired connection, wireless communication channels, such as a wireless network or direct wireless communication, or some combination thereof. The identity verification server comprises one or more processors and a storage. In some embodiments, the storage comprises instructions that, when executed by the one or more processors, cause the identity verification server to perform identity verification, event tracking, and/or event correlation operations as described herein. In a different or further embodiment, the identity verification server comprises a firmware and/or one or more ASICs configured to perform identity verification, event tracking, and/or event correlation operations as described herein. The identity verification server is configured to communicate with a graph database via the one or more communication channels. In some embodiments, the identity verification server comprises a facial recognition engine and a facial feature metadata store. In such embodiments, the identity verification server can be configured to perform facial feature metadata generation and/or facial recognition operations as described herein. In a different or further embodiment, the identity verification server is configured to communicate with a facial recognition server over the one or more communication channels.

Example 11—Example Facial Recognition Server

In any of the examples described herein, facial recognition server can be a server computer configured to communicate with one or more identity verification servers over one or more communication channels. The one or more communication channels can include wired communication channels, such as a wired network or direct wired connection, wireless communication channels, such as a wireless network or direct wireless communication, or some combination thereof. The facial recognition server can comprise a facial recognition engine and/or a facial feature metadata store that can serve as a gallery for facial recognition. The identity verification server can comprise one or more processors. In a further embodiment, the facial recognition server comprises a storage storing instructions that, when executed by the one or more processors, cause the facial recognition server to perform facial feature metadata generation and/or facial recognition operations as described herein. In a different or further embodiment, the facial recognition server comprises a firmware and/or one or more ASICs configured to perform facial feature metadata generation and/or facial recognition operations as described herein as described herein.

Example 12—Example Facial Feature Template

In any of the examples described herein, facial feature template comprises information describing various features of human faces. The various features of human faces can include eye shape; inter-pupillary distance; nose shape and/ or size; ear shape, size, and/or location; mouth shape, size, and/or location; face width-to-height ratio, etc. Each facial feature of a face image can be assigned an identifiable value. Several such face images are then collected and analyzed to identify the overarching standardized correlations between individual facial features. A collection of such abstracted correlations is called a model. One or more models can be used to identify variances in the facial features of a face image relative to the one or more models. These variances can be used to establish a unique identity of a face image. A facial feature model can comprise quantifiable data describing various facial features of a human face depicted in one or more associated images. The facial feature models can be compared to one another, for example by a facial recognition engine, to determine a relative similarity of the facial feature models.

Example 13—Systems and Methods for Event Notification

In any of the examples herein, systems and methods can be provided for receiving event information associated with verified identities and transmitting event notifications based on the received reports.

Figure 10:
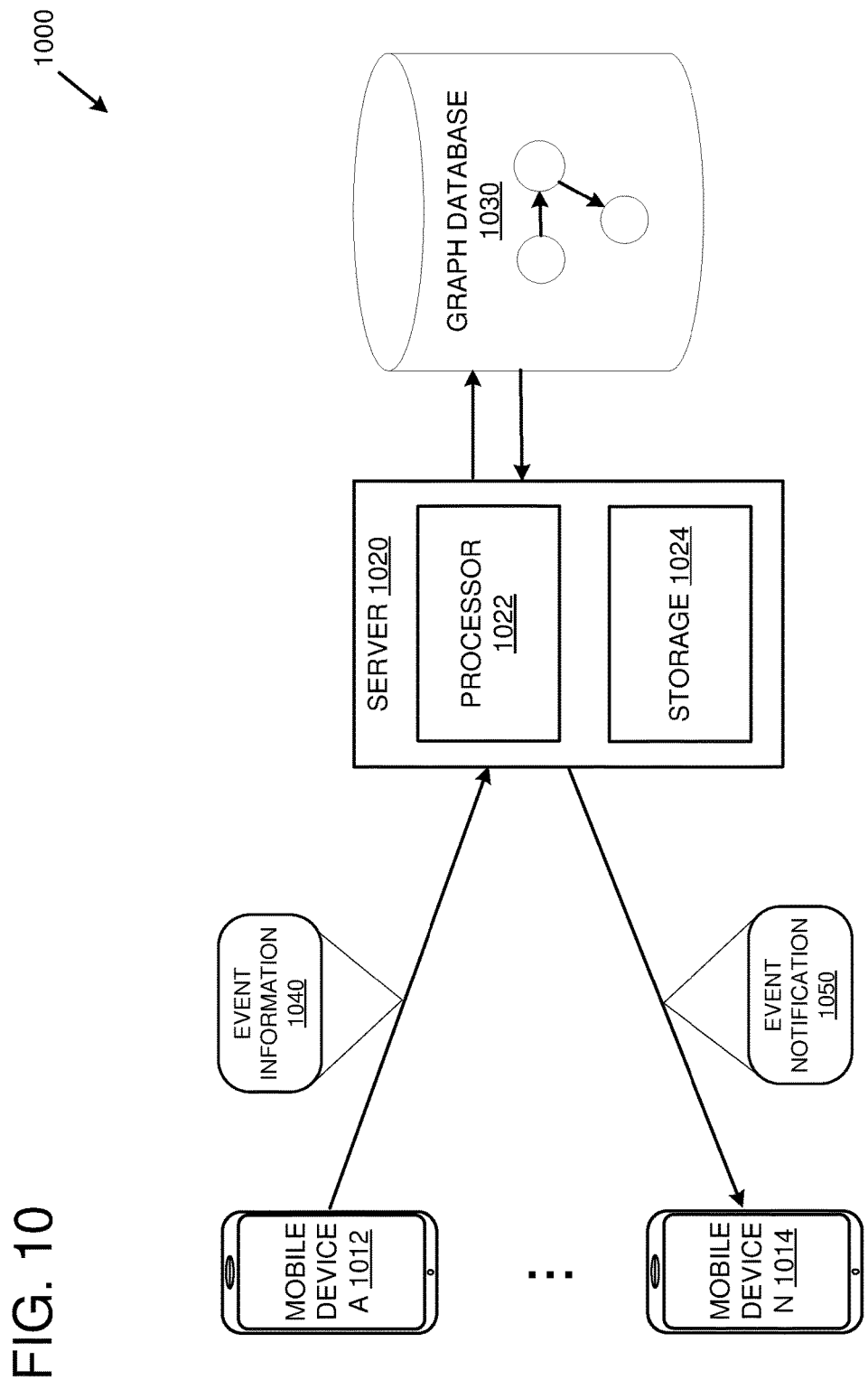
FIG. 10 is a system diagram depicting an example system for event reporting and notification using multiple mobile devices and a graph database.

FIG. 10 is a system diagram depicting an example system 1000 for event reporting and notification using multiple mobile devices (e.g., mobile device A 1012-mobile device N 1014) and a graph database 1030. The multiple mobile devices 1012-1014 are configured to transmit event information (e.g., event information 1040) to a server 1020 and to receive event notifications (e.g., event notification 1050) from the server 1020. The multiple mobile devices 1012-1014 are configured to display received notifications. The multiple mobile devices 1012-1014 can also be configured to allow users of the mobile devices 1012-1014 to view details about received event notifications, including any verified identities involved in the event.

The event information (e.g., 1040) can comprise information about one or more events related to one or more verified identities. A verified identity can be an identity of a person that has been verified using any of the identity verification technologies described herein. The event information (e.g., 1040) can comprise an identifier that can be used to uniquely identify the verified identity and data related to the one or more events.

The server 1020 comprises a processor 1022 and a storage 1024. The server 1020 is configured to receive event information (e.g., 1040), to identify one or more nodes in the graph database 1030 associated with the verified identity and the mobile devices from which the event information is received, to determine relationships between the identified nodes, to identify one or more additional node connected to the verified identity nodes by similar relationships, and to transmit event notifications (e.g., 1050) to one or more of the multiple mobile devices 1012-1014 associated with the identified additional nodes. The server 1020 can be configured to update one or more graph data structures in the graph database 1030 based on the received event information (e.g., 1040). In at least some embodiments, the server 1020 can be an identity verification server as described herein.

Figure 11:
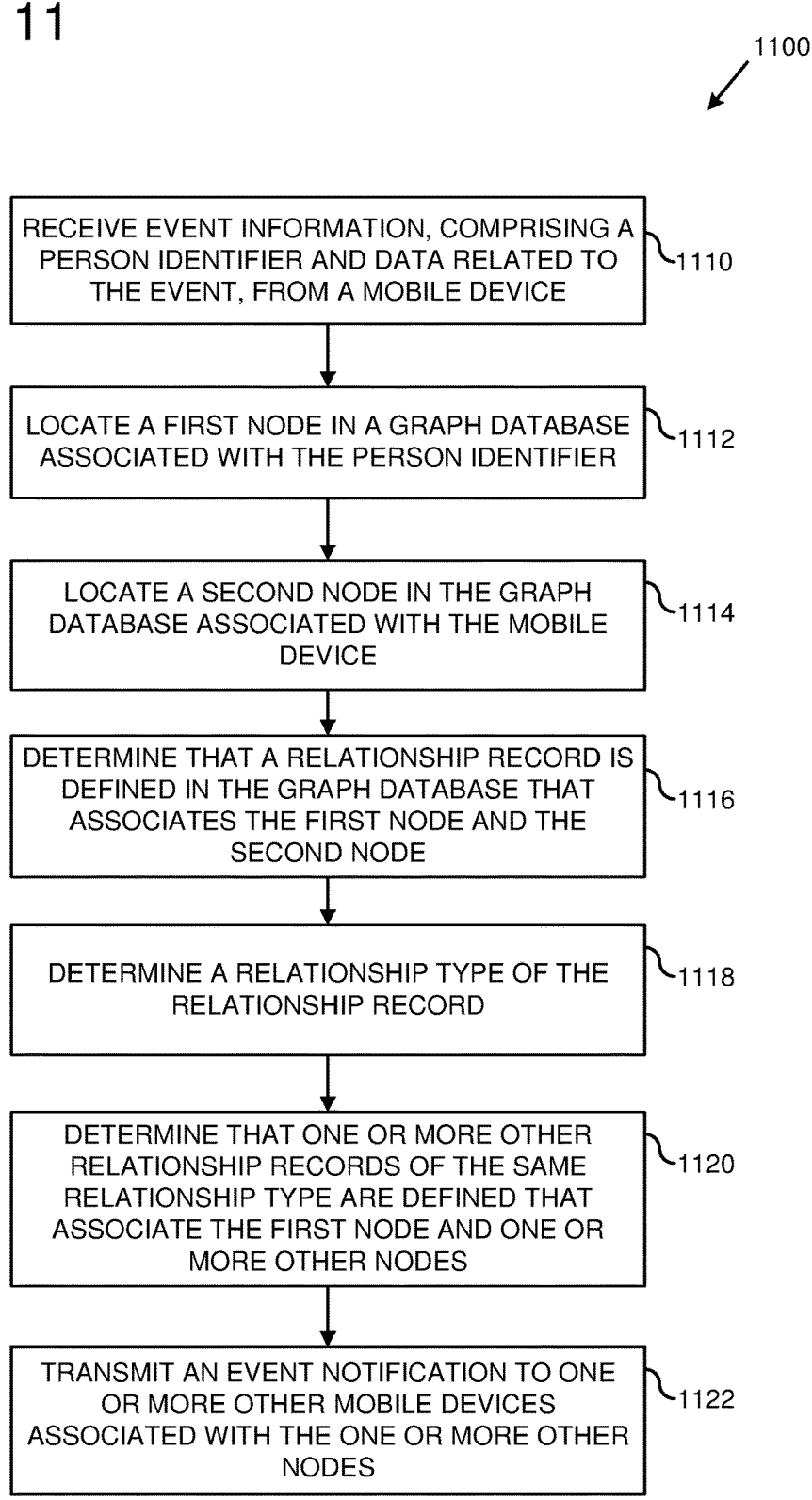
FIG. 11 is a flowchart depicting an example method for generating event notifications using a graph database.

FIG. 11 is a flowchart depicting an example method 1100 for generating event notifications using a graph database. Example method 1100 can be performed using any server as described herein.

At 1110, event information is received from a mobile device comprising a person identifier and data related to the event. At 1112, a first node is located in a graph database, wherein the first node is associated with the person identifier. The person identifier can be a unique identifier that is associated with the first node. For example, the person identifier can be a unique identifier that was created by the graph database when the first node was created, for use in retrieving the first node. In a different or further embodiment, the person identifier can comprise one or more pieces of demographic information that can be used to identify a person (such as a government identity number, etc.).

Nodes in the graph database can be associated with node types. Such node types can be defined in one or more schemas that can define the data that can be stored in nodes of the various types and/or the types of relationships that can be associated with the nodes of the various types. For example, the first node can be associated with a person node type which indicates that the node stores data related to a person. In such a case, the first node can be referred to as a person node.

The first node can be located in the graph database by issuing a query, requesting the return of the first node, given the person identifier. In an embodiment where the first node is a person node, the query can comprise a filter specifying that the search for the first node using the person identifier should be limited to person nodes. Including such a filter can, in some cases, improve the performance of the query.

At 1114, a second node in the graph database is located, wherein the second node is associated with the mobile device from which the event information was received. The mobile device can be associated with a node in the graph database using an identifier for the mobile device, such as a token issued to the mobile device by the server or another server, a unique number associated with the mobile device (such as a mobile phone number a MAC address, etc.), or some combination thereof. In some embodiments, the node associated with the mobile device identifier is the second node. However, in at least one embodiment, the node associated with the mobile device identifier is connected to the second node by a relationship in the graph database. For example, the second node can be another person node connected to the node associated with the mobile device identifier by a relationship that indicates that a person associated with the person node is an owner of the mobile device.

At 1116, it is determined that a relationship record is defined in the graph database that associates the first node and the second node. The determination can comprise, for example, transmitting a query to the graph database, requesting relationships that connect the first and second nodes. At 1118, a relationship type of the relationship is determined. In at least some embodiments, the relationship type can be determined by inspecting the relationship record. For example, the relationship record may store a reference to its relationship type. Alternatively or additionally, the graph database can be queried to determine a type of the relationship record. Alternatively or additionally, contents of the relationship record can be inspected to match the relationship record to a relationship type based on a schema.

In some scenarios, the first and second nodes are connected by more than one relationship. In such a scenario, determining the relationship type can comprise selecting a relevant relationship, of the more than one relationship. Selecting the relevant relationship can comprise analyzing the received event information to ascertain a relevant relationship type and searching the more than one relationship records to identify one of the more than one relationship records that has the relevant relationship type.

In at least one embodiment, the first node is a first person node associated with the received person identifier, the second node is a second person node, and the relationship has an employment relationship type, which indicates that an employment relationship exists between a person associated with the first person node and another person associated with the second person node.

Some relationship types can have directions. For example, in an embodiment where the relationship associating the first and second nodes is an employment relationship type, the employment relationship type can comprise a direction which indicates that the person associated with the first node, for example, is employed by the person associated with the second node. In a further embodiment, the direction can be represented by designating one of the two nodes as a target node, or a node to which the relationship is directed. In a different or further embodiment, the relationship can comprise properties that designate roles with the associated nodes. For example, the employment relationship type can comprise a property that identifies the first node as an employee and another property that identified the second node as an employer.

Alternatively or additionally, the first and second nodes can comprise values that indicate roles associated with the nodes with respect to the relationship. For example, in an embodiment where the first and second nodes are connected by a relationship of an employment relationship type, the first and second nodes can comprise values that indicate which node represents an employer and which node represents an employee. For example, the first node can comprise a person type value that indicates that the first person node is an employee type person node. Similarly, the second node can comprise a person type value that indicates that the second person node is an employer type person node.

At 1120, it is determined that one or more other relationship records are defined in the graph database that associate the first node and one or more other nodes. For example, after the relationship type of the relationship record associating the first and second nodes has been determined, a query can be transmitted to the graph database to identify one or more other nodes associated with the first node by relationships of the same type.

For example, in an embodiment where the relationship type of the relationship record is determined to be an employment relationship type and it is determined, based on the relationship and/or values stored in the first and second nodes, that the first node is associated with a person employed by a person associated with the second node, the graph database can be searched for one or more other relationship records of the employment relationship type where the first node is also designated as an employee. If one or more such relationships are found, the one or more other nodes associated with the first node by the relationships can be retrieved.

At 1122, an event notification is transmitted to one or more other mobile devices associated with the one or more other nodes. In at least some embodiments, the one or more other mobile devices can be identified using the graph database. For example, identifiers that can be used to transmit messages to the one or more mobile devices (such as mobile phone numbers, IP addresses, MAC addresses, etc.) can be stored in the one or more other nodes. For example, the one or more other nodes can be person nodes that store identifiers for mobile devices associated with the one or more persons. Alternatively or additionally, the identifiers for the mobile devices can be stored separately in mobile device nodes that are associated with the one or more other nodes by relationship records.

The event notification can comprise information pertaining to the event. For example the event notification can include some or all of the data pertaining to the event that was included in the received event information. Alternatively or additionally, the event notification can include information pertaining to the first node, such as profile information associated with the first node, an image associated with the first node, etc. In at least one embodiment, the notification comprises one or more directives and/or instructions that, when processed by a mobile device, will cause the mobile device to launch an identity verification application on the mobile device. In a further embodiment, the directives or instructions, further cause the identity verification application to perform one or more actions once it is launched. For example, one or more of the directives and/or instructions can cause the identity verification application to retrieve additional information pertaining to the event from the server and display the additional information via a user interface of the mobile device.

The event notification can be transmitted to the one or more other mobile devices using the identifiers for the mobile devices. One or more communication channels can be used for transmitting the event notification. The type communication channel used can be based on the type of a mobile device identifier. For example, if the mobile device identifier is a mobile phone number, then the event notification can be transmitted to the mobile device via a text message, such as an SMS message. Alternatively or additionally, the mobile device identifier can indicate that the event notification should be transmitted to the mobile device over the Internet.

In at least some embodiments, the mobile device identifier comprises a value that indicates that the mobile device can receive notifications via a notification service, such as the Apple Notification Service, Firebase, etc.

When the notification is received by a mobile device, the notification can be displayed via a user interface of the mobile device, such as a lock screen of the mobile device, a notification view of the mobile device, a user interface of an identity verification application running on the mobile device, etc.

In at least one embodiment, the data related to the event in the event information comprises a rating of an employee associated with the first person node. In such an embodiment, the example method 1100 can further comprise creating a rating node in the graph database and storing the rating information in the rating node. The method 1100 can further comprise creating a relationship record in the graph database associating the first node and the rating node, wherein the created relationship node has a relationship type indicating that the rating node comprises a rating for the person associated with the first node. Alternatively or additionally, the rating node can also be associated with the second node, wherein the relationship record has a relationship type indicating that the rating node comprises a rating made by the person associated with the second node. The rating information can comprise one or more rating values corresponding to one or more rating categories and/or one or more comments.

Figure 12:
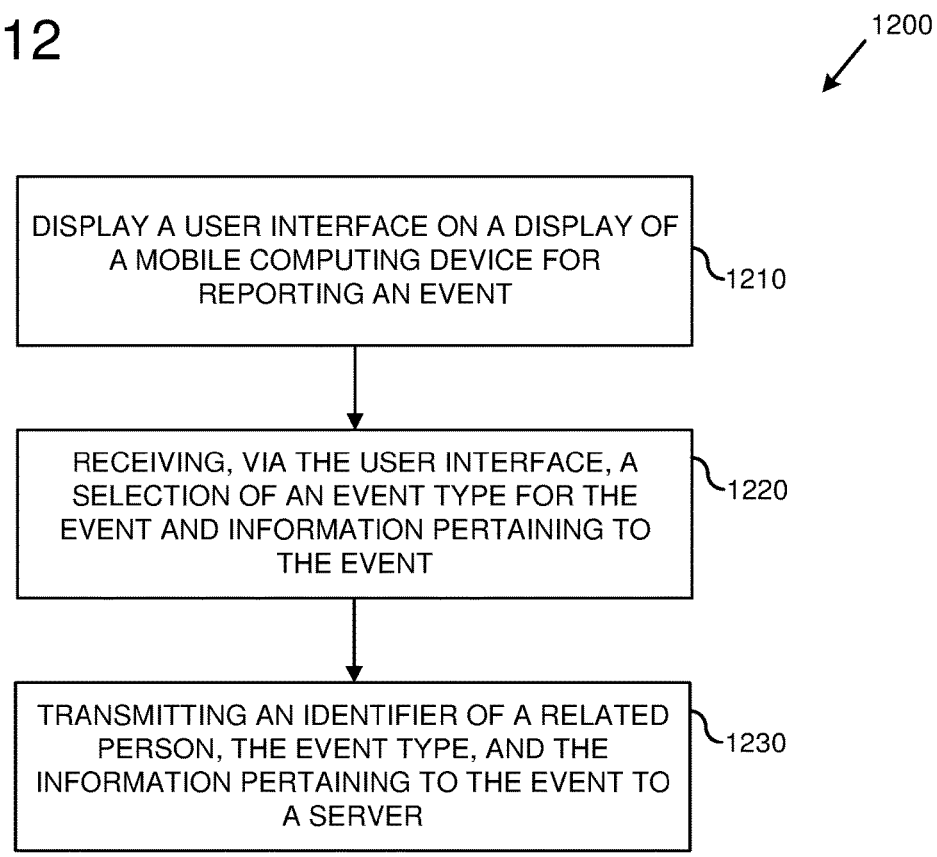
FIG. 12 is a flowchart depicting an example method for reporting event information using a mobile computing device.

FIG. 12 is a flowchart depicting an example method 1200 for reporting event information using a mobile computing device. At 1210, a user interface is displayed on a display of a mobile computing device for reporting an event. The user interface can comprise one or more with which a user can interact to indicate that the user wishes to report an event, to select an event type for the event, to provide information pertaining to the event, to identify a person related to the event, and to indicate that the event report should be sent to the server.

At 1220, a selection of an event type for the event and information pertaining to the event is received via the user interface. The event type can be selected from one or more supported event types. The various event types may be designated as such on the user interface. For example, a user interface component, such as a drop-down list, can be presented from which the user can select an event type. Alternatively, the event type may not be designated as event types on the user interface. In such an embodiment, selection of different user interface components, such as buttons or menu options, can cause an event type to be selected implicitly.

Example event types include, but are not limited to, reporting attendance for a person, reporting a criminal incident or accident, reporting a rating and/or review for a person, reporting a job interview for a person, and/or reporting a request for identity verification for a person.

The information pertaining to the event can comprise a description of the event, a date and/or time that the event occurred, an approximate geographic location at which the event occurred, etc. The information pertaining to the event can be based, at least in part, on the event type of the event. For example, if the event type relates to attendance, the information pertaining to the event can comprise information about a work shift, class, presentation, etc. to which the attendance pertains. In such an embodiment, the information pertaining to the event can indicate whether the person related to the event was absent, present, on time, late, etc.

At 1230, the information pertaining to the event, the event type, and an identifier of a related person are transmitted to a server. In at least some embodiments, the server can be an identity verification server. The identifier of the person related to the event can be selected by a user via the user interface. For example, a list of persons, for which the user of the mobile device is authorized to report events, can be presented on the user interface of the mobile device. The user can select a person via the user interface to indicate that the selected person is related to the event. The list of persons can comprise persons whose identities have been verified by the user of the mobile device, or by another user related to the user of the mobile device, using identity verification technologies described herein.

Figure 13:
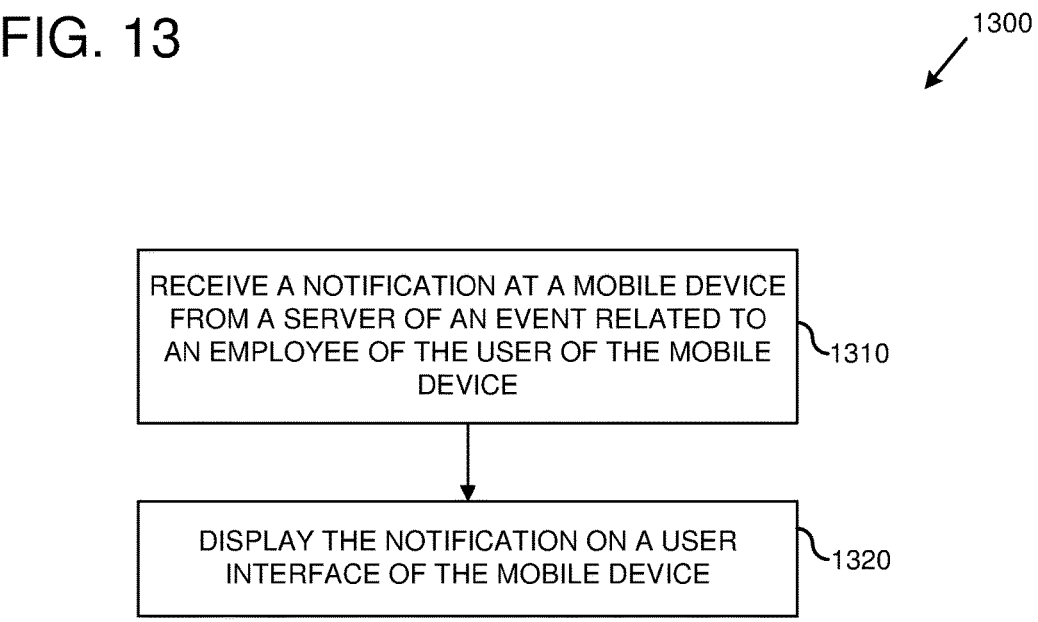
FIG. 13 is a flowchart depicting an example method for presenting employee-related notifications using a mobile device.

FIG. 13 is a flowchart depicting an example method 1300 for presenting employee-related notifications using a mobile device. At 1310, a notification of an event related to an employee of a user of a mobile device is received at the mobile device from a server. In at least some embodiments, a report of the event notification is transmitted by the server in response to receipt, at the server, of a report of the event from another mobile device.

The notification can comprise a person identifier that can be used to identify the employee related to the event. The person identifier can comprise a unique identifier that can be used to identify a record related to the employee in a data store (such as a node in a graph database). Alternatively or additionally, the person identifier can comprise a name of the employee. In at least some embodiments, the employee is a verified identity that has been verified using identity verification technologies described herein.

At 1320, the notification is displayed on a user interface of the mobile device. The notification can be displayed, for example, on a lock screen of the mobile device. Alternatively or additionally, the notification can be displayed in a notification view of the mobile device. In a different or further embodiment, displaying the notification can comprise playing one or more sounds through a speaker of the mobile device and/or triggering a vibration mechanism of the mobile device.

In at least one embodiment, the notification can be displayed on a user interface of an identity verification application being executed on the mobile device. The user interface can be, for example a section of a home screen of the application user interface, a notification area of the application user interface, and/or a modal or modeless dialog window of the application user interface.

In at least one embodiment, the notification comprises one or more directives and/or instructions that, when the notification is activated, will cause the mobile device to launch an identity verification application on the mobile device. For example, in an embodiment where the notification is displayed on a lock screen of the mobile device, the user, by interacting with the notification, can cause the mobile device to be unlocked and the identity verification application to be launched. In a further embodiment, the directives or instructions can further cause the identity verification application to perform one or more actions once it is launched. For example, the notification can contain an event notification identifier that can be transmitted to the server by the identity verification application and additional information about the event can be received from the server in response. The additional received information can be displayed by the identity verification application in a user interface of the mobile device.

Example 14—Example Event Information

In any of the examples described herein, event information can comprise information describing one or more events. The event information can include an event type and/or classification that can be differentiate the event information. In some embodiments, the processing of the event information can be based, at least in part, on the event type and/or classification. The event information can comprise one or more person identifiers that can be used to identify one or more individuals associated with the event. In embodiments where the event information was generated by a mobile device, the event information can comprise a mobile device identifier that can be used to identify a mobile device that generated the event information. In a different or further embodiment, the event information can comprise a geographic location of the mobile device that generated the event information and/or an approximate geographic location where the event occurred. The event information can comprise a date and/or time when the event occurred. The event information can comprise additional data pertaining to the event. In some embodiments where the event information comprises an event type and/or category, the contents and/or organization of the additional data pertaining to the event can be based on the event type and/or category.

Example 15—Example Event Notification

In any of the examples described herein, an event notification can comprise information related to a reported event. In at least some embodiments, an event notification is generated by an identity verification server upon receipt of event information from a mobile device. In such an embodiment, the generated event notification can comprise some or all of the data contained within the received event information. The event notification can comprise one or more person identifiers that can be used to identify one or more individuals associated with the event. The event notification can comprise a type and/or category of the event. The event notification can comprise a summary message describing the event that can be displayed on a display of a mobile device that receives the event notification. In at least some embodiments, the event notification can comprise an incident identifier that can be used to retrieve information pertaining to the event from a server. The event notification can comprise one or more directives or instructions that, when processed by a mobile device receiving the event notification, will cause the mobile device to launch or display a user interface of an identity verification application. The event notification can comprise one or more reports of one or more identified event correlations and/or patterns.

Example 16—Example Methods for Attendance Tracking

In any of the examples described herein, methods can be provided for tracking events related to attendance and filtering duplicate event information.

Figure 14:
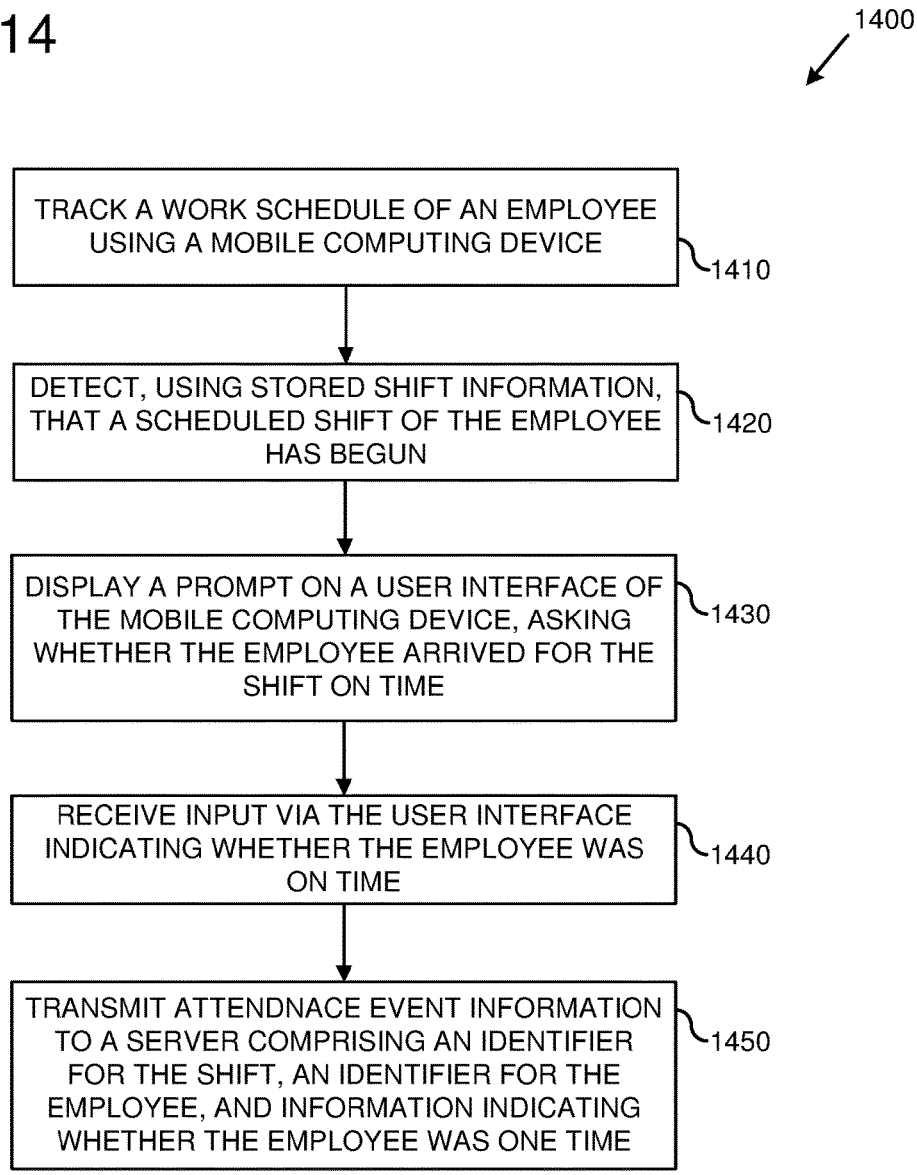
FIG. 14 is a flowchart depicting an example method for tracking attendance event information using a mobile computing device.

FIG. 14 is a flowchart depicting an example method 1400 for tracking attendance event information using a mobile computing device. At 1410, a work schedule of an employee is tracked using a mobile device. The mobile device can store data pertaining to the work schedule of the employee, comprising stored shift information. Shift information can include, for example, dates and times that the employee is scheduled to work. In at least one embodiment, the shift information comprises one or more shift records, wherein a shift record identifies a day of the week when the employee is scheduled to work. In some further embodiments, a shift record further comprises a time range for the day of the week when the employee is scheduled to work on the identified day of the week. The work schedule for the employee can be tracked comparing a particular date and/or time to one or more of the stored shift records to determine whether the employee is scheduled to work at the particular time.

At 1420, it is detected, using the stored shift information, that a scheduled shift of the employee has begun. The mobile computing device can compare a given date and/or time to one or more of the stored shift records and identify one of the shift records that indicates that the employee is scheduled to work the scheduled shift at the given date and/or time.

At 1430, a prompt is displayed on a user interface of the mobile computing device, asking whether the employee arrived for the shift on time. In at least one embodiment, the prompt comprise one or more user interface components configured to receive input from a user of the mobile computing device. For example, the prompt can display a message, asking whether the employee arrived for work on time and the one or more user interface components can allow the user to provide an answer of yes or no. In another example, the prompt can display a message, asking whether the employee was on time or late for work and the one or more user interface components can allow the user to indicate either that the user was on time or late.

The prompt can comprise a name and/or image of the employee.

In a different or further embodiment, the prompt can comprise user interface components that allow the user to indicate that the employee was either late for work or absent. In such an embodiment, the user would not activate one of the user interface components if the employee was on time. If that is the case, the mobile computing device can be configured to send attendance event information indicating that the employee was on time for the shift if the date and/or time range specified for the shift passes without receiving input via the one or more components from the user. Alternatively, the mobile computing device can be configured to only transmit attendance event information when the user indicates that the employee was not on time.

At 1440, input is received via the user interface, indicating whether the employee was on time. For example, the input can be received when the user interacts with one of the one or more user interface components to indicate whether the user was on time, late, absent, etc.

In at least one embodiment, the prompt is displayed on a lock screen of the mobile computing device. The lock screen can be, for example, a screen that is displayed when the mobile computing device is first activated after being turned off or put into a sleep mode. In such an embodiment, input indicating whether the employee arrived for the shift on time can be received via the lock screen. For example, in at least some embodiments, the one or more user interface components can be displayed on the lock screen of the mobile computing device. In such an embodiment, the input can be received via the one or more user interface components on the lock screen.

In at least one embodiment, the prompt is displayed on a screen of an application running on the mobile computing device, such as an identity verification application. In such an embodiment, the prompt can be displayed on the screen when it is determined that a shift for the employee has begun and the prompt can be removed when input is received indicating whether the employee was on time and/or when it is determined that the shift has ended.

At 1450, attendance event information, comprising an identifier for the shift, an identifier for the employee, and information indicating whether or not the employee was on time for the shift, is transmitted to a server. In at least some embodiments, the server can be an identity verification server.

Upon receiving the attendance event information, the server can update one or more graph data structures in a graph database. For example, the server can create one or more attendance nodes in the graph database to store at least part of the attendance event information. Additionally, the server can create a relationship record in the graph database to associate a person node with the created attendance node, wherein the related relationship record has a relationship type indicating that the attendance node comprises attendance information for the person node. The person node can be associated with the employee and can be found in the graph database using the identifier for the employee. The created attendance node can be used, in combination with other attendance nodes associated with the person node to determine a work attendance history for the employee.

In a different or further embodiment, the server can transmit one or more event notifications to one or more other mobile devices, wherein the one or more event notifications comprise some or all of the attendance event information.

Figure 15:
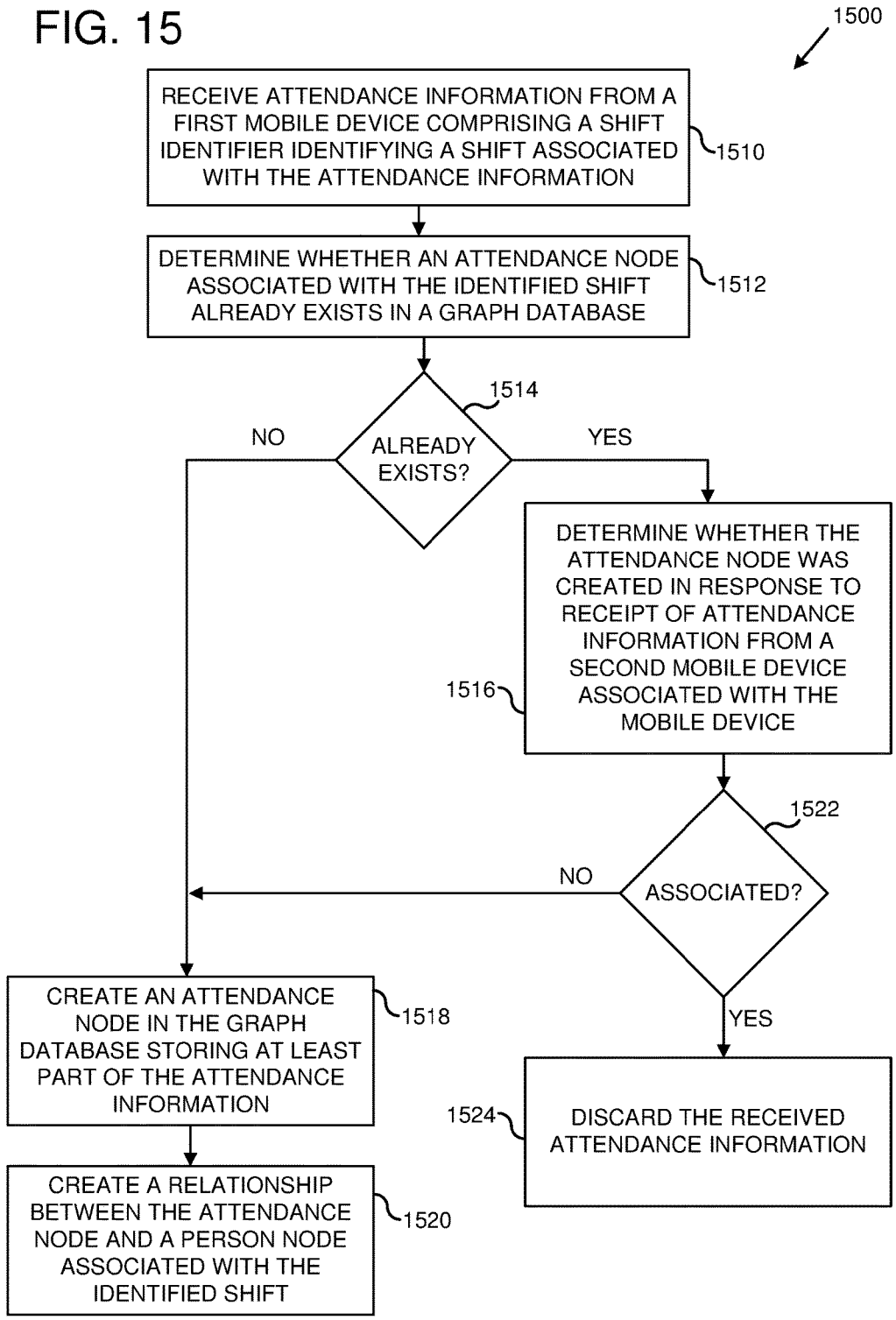
FIG. 15 is a flowchart depicting an example method for filtering duplicate event information.

FIG. 15 is a flowchart depicting an example method 15—for filtering duplicate attendance event information.

In some cases, it can be advantageous to filter duplicate attendance information. It is possible, in some embodiments, for attendance information for a shift to be reported by multiple members of a same organization or household. In such embodiments, when attendance information is submitted by a user for an employee's shift, it is possible that another user may have already reported attendance information for the shift via a different mobile device. In at least some cases, it can be undesirable to store duplicate attendance information for a same shift. For example, storing duplicate information may skew generated reports that comprise aggregate values, such as average timeliness and/or percentage of shift where the employee was late. The described technologies can be used to detect such duplicate attendance information before it is stored in the graph database, thereby avoiding such issues.

At 1510, attendance information is received from a first mobile device comprising a shift identifier identifying a shift associated with the attendance information. The shift identifier can be, or example a unique identifier that can be used to reference a nodes associated with the shift in a graph database. Alternatively or additionally, the shift identifier can comprise a unique identifier for referencing a node associated with a person in the graph database and additional information for identifying a node for a particular shift associated with the referenced person node. The attendance information can comprise one or more values indicating an attendance status, such as whether a person associated with the identified shift arrived for the shift on time. In at least one embodiment, the attendance information can indicate that the person associated with the shift was later for work, was absent, or was on time. In a different or further embodiment, the attendance information can comprise a date and/or time that the person associated with the shift arrived for work.

In at least one embodiment, a node associated with the identified shift node stores information describing one or more days of the week and/or times of day that the associated person is scheduled to work and the attendance information identifies a particular date and/or time. For example, the node associated with the shift may indicate that the associated person is scheduled to work Monday through Wednesday, from 12:00 pm to 6:00 pm and the received attendance information may comprise an attendance status for Monday, Apr. 4, 2016.

At 1512, it is determined whether an attendance node associated with the identified shift already exists in the graph database. The graph database can be searched, using the shift identifier, to find a shift node associated with the identified shift. Relationship records in the graph database associated with the shift node can be analyzed to determine if one or more of the relationship records associate the shift node with a preexisting attendance node.

In embodiments where the identified shift node stores information describing one or more days of the week and/or times of day that the associated person is scheduled to work and the attendance information identifies a particular date and/or time, it is possible that the identified shift node is associated with multiple attendance nodes storing attendance information for multiple previous particular dates and/or times. In such a case, determining whether an attendance node associated with the identified shift already exists comprises determining whether any of the multiple attendance nodes store attendance information for the particular date and/or time contained in the received attendance information.

If it is determined at 1514 that an attendance node already exists, then at 1516 it is determined whether the preexisting attendance node was created in response to receipt of attendance information from a second mobile device associated with the mobile device. Determining that the preexisting attendance node was created in response to receipt of attendance information from a second mobile device can comprise identifying a relationship record in the graph database that associates the preexisting attendance node with another node in the graph database, wherein the relationship record has a relationship type that indicates that an entity identified by the associated node created the preexisting attendance node. The associated node can be, for example a mobile device node that identifies the second mobile device from which attendance information stored in the preexisting attendance node was received. In such an embodiment, the mobile device node for the second mobile device can be associated by another relationship record with a person node that identifies a person who owns the second mobile device. Alternatively or additionally, the associated node can be a person node that identifies a person who owns the second mobile device from which the attendance information stored in the preexisting attendance node was received.

Determining that the mobile device and the second mobile device are associated can comprise identifying a person node in the graph database associated with the mobile device, identifying another person node associated with the second mobile device, and determining whether the identified person nodes are associated by a relationship record in the graph database. The relationship record can, for example, have a relationship type which indicates that the persons identified by the person nodes are in a same household. Alternatively or additionally, the relationship record can have a relationship type which indicates that the persons identified by the person nodes are in a same business organization and/or that one or the persons is a manager or supervisor of the other person.

If it is determined at 1522 that the mobile device and the second mobile device are associated, then at 1524, the received attendance information is discarded.

If it is determined at 1522 that the mobile device and the second mobile device are not associated, or if it is determined at 1515 that an attendance node associated with the identified shift does not already exist, then at 1518 an attendance node is created in the graph database storing at least part of the received attendance information. At 1520, a relationship record is created in the graph database associating the newly created attendance node with a shift node for the identified shift.

In at least some embodiments, the attendance information comprises a person identifier that can be used to locate a person node in the graph database. In such embodiments, a relationship record can be created in the graph database associating the person node with the newly created attendance node. The newly created relationship record can have a relationship type which indicates that the attendance node comprises attendance information for the person described by the person node.

Although example method 1500 describes steps for filtering duplicate attendance information, the described techniques can be applied to other types of duplicate information as well.

Example 17—Example Methods for Reporting and Tracking Criminal Incident Information In any of the examples described herein, methods can be provided for reporting criminal incidents and accidents involving verified identities, tracking reported incidents, and identifying patterns of activity.

Figure 16:
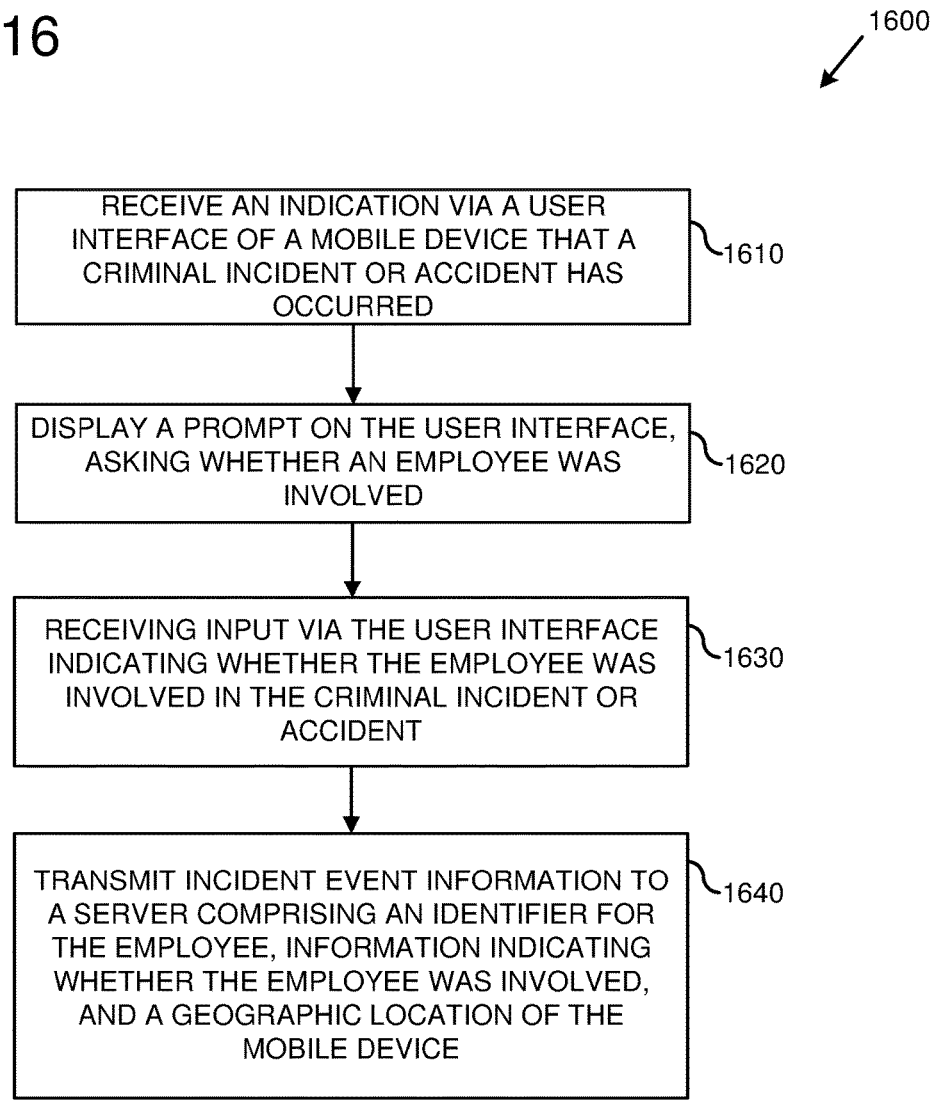
FIG. 16 is a flowchart depicting an example method for reporting criminal incident event information using a mobile computing device.

FIG. 16 is a flowchart depicting an example method 1600 for reporting criminal incident information using a mobile device. At 1610, an indication is received via a user interface of a mobile device that a criminal incident or accident has occurred. Example incidents that can be reported include theft, burglary, break-ins, assaults, kidnappings, accidental property damage, missing items, etc.

At 1620, a prompt is displayed on the user interface, asking whether an employee was involved. The prompt can comprise a listing of known employees. The known employees can comprise employees with identities that have been verified using identity verification technologies described herein. The listing employees can be limited to employees scheduled to work at a time when the criminal incident or accident occurred. Alternatively or additionally, the prompt can comprise an identification of an employee (such as by name, image, etc.) and user interface components that can be used to indicate whether the identified employee was involved in the incident.

At 1630, input is received via the user interface indicating whether the employee was involved in the criminal incident or accident. The input can comprise a selection of a particular employee from a listing of employees, an activation of a user interface component such as a radio button, etc.

At 1640, incident event information indicating the criminal incident or accident is transmitted to a server. The incident event information can comprise an identifier for the employee, information indicating whether the employee was involved in the incident, and a geographic location of the mobile device. In embodiments where the mobile device comprises a GPS antenna, obtaining the geographic location of the mobile device can comprise using the GPS antenna to obtain latitude and longitude coordinates for the mobile device. The identifier for the employee can be an identifier for a verified identity associated with the employee. The identifier for the employee can be used to locate a person node for the employee in the graph database. In at least some embodiments, the server can be an identity verification server.

The server can use received criminal incident event information to identify a pattern of criminal activity. The incident event information can comprise information pertaining to a criminal incident. The server can search one or more incident nodes in the graph database storing additional information for other criminal incidents and identify one or more patterns using the received criminal incident information and the stored criminal incident information.

In at least one embodiment, identifying the pattern of criminal activity comprises identifying one or more incident nodes in the graph database associated with a person node for the employee. In some circumstances, such a pattern can indicate that the employee has been involved in multiple reported criminal incidents. In a different or further embodiment, identifying the pattern of criminal activity can comprise identifying one or more incident nodes in the graph database with geographic locations within a given distance of the geographic location of the mobile device. The given distance can be specified as a radius of a circle centered on the geographic location of the mobile device. In a different or further embodiment, a spatial data structure can be used to identify incident nodes with geographic locations within the given distance of the geographic location of the mobile device. A pattern of criminal activity can be detected, for example, by determining that a specified number of criminal incidents of a same type occurred within the given distance and within a given time period.

In at least some embodiments, predictive analysis can be used to determine a statistical likelihood, based on a detected pattern of criminal activity, which another criminal incident matching the pattern will occur. Additionally or alternatively, predictive analysis can be used to predict one or possible geographic areas or locations where another criminal incident may occur. For example, when incidents are reported at different locations (such as different households), a regression can be run to identify one or more employees that are most likely involved in a number of the incidents. Once a set of likely employees has been identified, a classification process (such as k-nearest neighbor classification) can be used to identify households employing the identified employees that share non-linear characteristics with households previously impacted by the previously reported incidents of criminal activity. A report can then be dispatched to mobile devices associated with the identified households, warning them of potential criminal activity.

In a different or further embodiment, the report of the identified pattern of criminal activity can be transmitted to one or more mobile devices associated with one or more person nodes. The report of the pattern of identified criminal activity can be transmitted as part of an event notification.

In an embodiment where the identified pattern of criminal activity involves the employee, the report can be transmitted to mobile devices associated with one or more person nodes for one or more employers of the employee. The one or more person nodes can be person nodes associated with a person node for the employee by relationship records with relationship types that indicate that the relationships are employment relationships. In at least some embodiments, the report does not name the identified employee.

In an embodiment where the identified pattern of criminal activity involves geographic locations of reported incidents, the report can be transmitted to mobile devices associated with one or more person nodes storing locations within the given distance of the geographic location of the mobile device.

In at least some embodiments, the report can be transmitted to the mobile device from which the incident event information was received.

Example 18—Example Methods for Verifying Employee Identity and Tracking Employee Performance In any of the examples described herein, methods can be provided for verifying employee identity and tracking employee performance. Any of the technologies described herein can be applied to prospective employee scenarios, used to track events related to current employees, or both.

Figure 17:
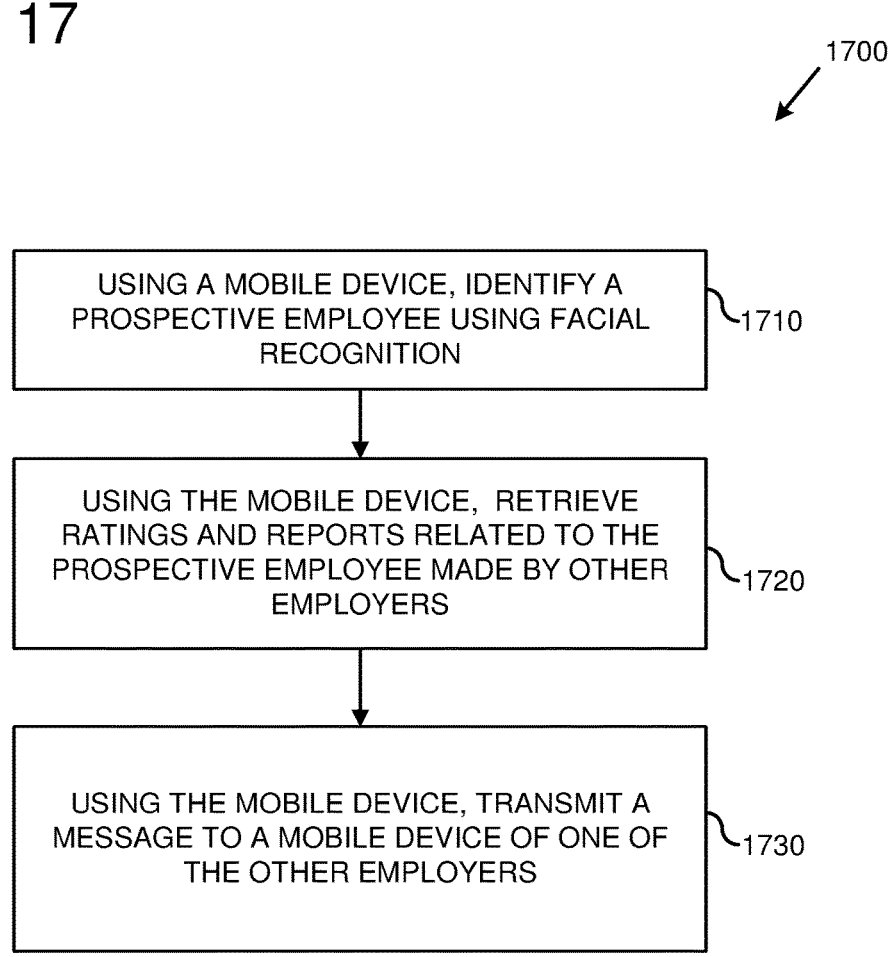
FIG. 17 is a flowchart depicting an example method for identifying a prospective employee using facial recognition, retrieving ratings and reports related the identified prospective employee, and transmitting a message to an employer of the prospective employee.

FIG. 17 is a flowchart depicting an example method 1700 for identifying a prospective employee using facial recognition, retrieving ratings and reports related the identified prospective employee, and transmitting a message to an employer of the prospective employee.

At 1710, a mobile device is used to identify a prospective employee using facial recognition. The mobile device can be used to capture an image of the prospective employee and to transmit the captured image to an identity verification server. The identity verification server can process the captured image and use facial recognition to match the captured image to one or more stored images. The identity verification server can identify a best match image and transmit the best match image to the mobile device. The mobile device can present the best match image to a user of the mobile device and request confirmation that a person depicted in the best match image is the prospective employee. A confirmation that the best match image depicts the prospective employee can be received from the user via a user interface of the mobile device.

At 1720, the mobile device is used to retrieve ratings and/or reports related to the prospective employee made by other employers. A person identifier associated with the best match image can be obtained from the identity verification server. The person identifier can be used to retrieve ratings and/or reports related to the prospective employee from the identity verification server. The ratings and/or reports can be related to various aspects of the prospective employee's job performance. For example, ratings and/or reports can be obtained on such topics as quality, honesty, hygiene, personality, and punctuality. Reports can also be obtained that describe accidents and/or criminal incidents that the prospective employee was involved in and/or that occurred at an employer's location while the prospective employee was working at that location. Reports can also be obtained that describe the prospective employee's current work schedule and/or geographic locations of the prospective employee's other places of the employment.

At 1730, the mobile device is used to transmit a message to a mobile device of one of the other employers. The message can be a message asking for additional information about a rating or report made by the one of the other employers. The message can be transmitted to the identity verification server, along with an identifier for the rating or report and/or an identifier for the employer that made the rating or report. The identity verification system can user the provided one or more identifiers to locate another identifier for a mobile device associated with the employer. For example, the one or more identifiers can be used to locate a person node in a graph database associated with the employer who made the report or rating. A mobile device identifier that is associated with the person node can be retrieved and used by the identity verification server to direct a transmission of the message to the identifier mobile device. The employer who made the report or rating can use the identified mobile device to transmit a reply message in a similar manner.

In at least some embodiments, the identity verification server can transmit event notifications to current employers of the prospective employee, notifying them that the employee is being considered for employment elsewhere. For example, when the mobile device is used to confirm that the best match image depict the prospective employee, other employers that currently employ the prospective employee can be identified. The notification can be transmitted to mobile devices associated with the identified employers. The notification can comprise information indicating that the employee is being considered for employment by another employer. In at least one embodiment, the notification can comprise a geographic location associated with the mobile device used to transmit the captured image of the prospective employee at 1710. In a further embodiment, a map can be displayed on a user interface of the mobile device, wherein the geographic location associated with the mobile device used to capture the image of the prospective employee is identified on the map.

Example 19—Example Mobile Device User Interfaces

In any of the examples described herein, mobile device user interfaces can be provided for identity verification and tracking.

FIG. 18A is a diagram depicting an example mobile device user interface 1810 for verifying a potentially matched identity. The user interface 1810 is displayed on a display 1804 (such as a screen or other display component) of an example mobile device 1802.

User interface 1810 comprises a captured image 1812 captured using a camera (not shown) of the mobile device 1802 and a candidate match image 1814. A user of the mobile device 1802 can interact with example buttons 1816 and 1818 to confirm or deny, respectively, that the captured image 1812 and the candidate match image 1814 depict a same person.

FIG. 18B is a diagram depicting an example mobile device user interface 1820 for viewing profile information for an identified person. User interface 1820 comprises demographic information 1826, including one or more known names of the identified person. User interface 1820 also comprises information about the identified person's current employment 1822, including information about a listing of the identified person's current employment engagements, icons representing the types of jobs the identified person performs at each employment engagement, and a distance that each employment engagement is from a geographic location of the mobile device 1802. A user of the mobile device 1802 can interact with a button 1824 to send a message to an employer of the identified person. The user of the mobile device 1802 can interact with a button 1826 to indicate that the identified person is an employee of the user. The user of the mobile device 1802 can interface with a button 1828 to cause an image of an identification card for the identified person to be retrieved from a server and to be displayed on the user interface 1820.

FIG. 18C is a diagram depicting an example mobile device user interface 1830 for obtaining profile information for an unidentified person. The user interface 1830 comprises a message informing a user of the mobile device 1802 that a match was not found for the captured image 1812. The user interface 1832 comprises user interface components that the user of the mobile device 1802 can interact with to provide profile information for the unidentified person. The user of the mobile device 1802 can interact with a button 1834 to save new profile information in association with the captured image 1812. The user of the mobile device 1802 can interact with user interface component 1836 to capture an image of an identification card for the unidentified person.

Figure 19A:
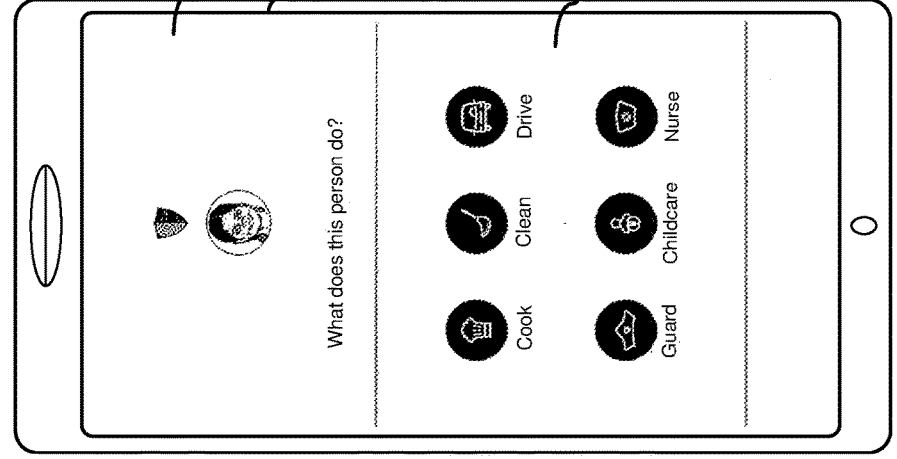
FIG. 19A is a diagram depicting another example mobile device user interface for viewing profile information for an identified person.

FIG. 19A is a diagram depicting another example mobile device user interface 1910 for viewing profile information for an identified person. The user interface 1910 comprises average ratings 1912 made by employers of the identified person for several aspects of work performance. Ratings are shown for example aspects of quality, honesty, hygiene, personality, and punctuality. These examples are provided for illustration and are not intended to be limiting. Ratings for other aspects of job performance are also possible. The user interface 1910 also comprises comments 1914 made by employers of the identified person about the identified person's job performance Overall ratings of the identified person's job performance, provided by the employers who made the comments, are presented alongside the comments.

Figure 19B:
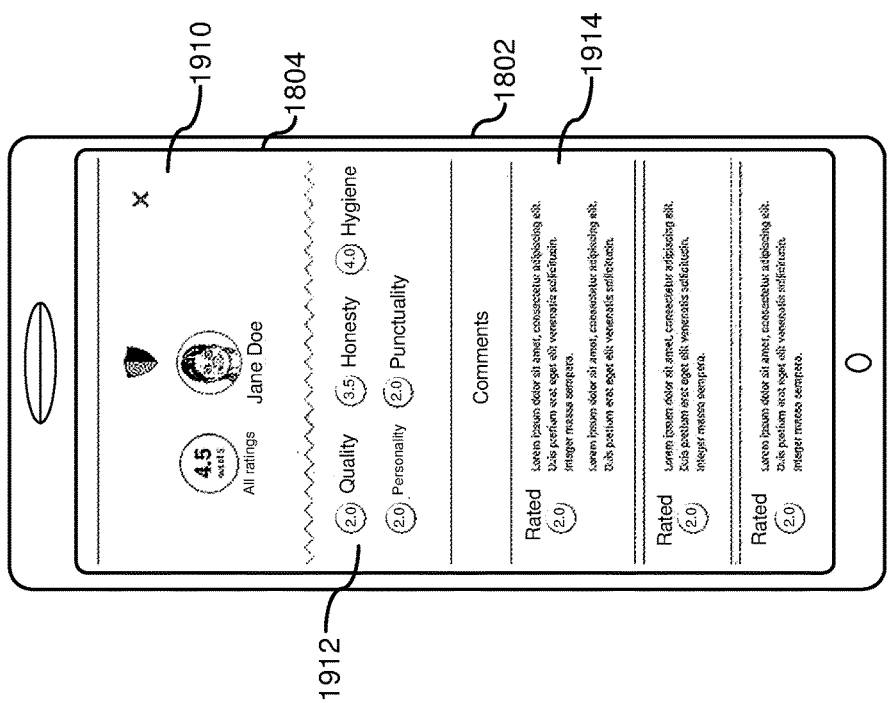
FIG. 19B is a diagram depicting another example mobile device user interface for obtaining profile information for a person.

FIG. 19B is a diagram depicting another example user interface 1920 for obtaining profile information for a person. A user of the mobile device 1802 can interact with one or more of buttons 1922 to indicate jobs that the person performs for the user. The list of example jobs shown is provided for illustration and is not intended to be limiting.

FIG. 20A is a diagram depicting an example mobile device user interface 2010 for tracking a work schedule for an identified person. The user interface 2010 comprises shift information 2012 for the identified person. Although the shift information 2012 is illustrated as presenting information for two shifts, other numbers of shifts are possible. A user of the mobile device 1802 can interact with a button 2014 to add another shift for the identified person. The user of the mobile device 1802 can interact with the sliders (e.g., 2016) and day-of-the-week buttons (e.g., 2018) to edit shift information for existing shifts. The user of the mobile device 1802 can interact with the user interface component 2019 to indicate whether the identified person is a live-in or daily employee.

FIG. 20B is a diagram depicting an example mobile device user interface 2020 for tracking attendance information via a lock screen of a mobile device. The user interface 2020 is presented on an example lock screen 1806 of the mobile device 1802. A message 2026 is presented, asking whether an employee showed up for work. A user of the mobile device 1802 can interact with a button 2022 to indicate that the employee showed up for work. The user of the mobile device 1802 can interact with a button 2024 to indicate that the employee did not show up for work. In at least some embodiments, interacting with the button 2022 and/or the button 2024 can cause the user interface 2020 to be removed from the lock screen 1806.

FIG. 20C is a diagram depicting an example mobile device user interface 2032 for tracking attendance information via a home screen 2030 of an application running on the mobile device 1802. A user of the mobile device 1802 can interact with a button 2038 on the home screen 2030 to verify an identity of a person. The user of the mobile device 1802 can interact with a button 2039 on the home screen 2030 to report an incident involving an identified person. The user interface 2032 can be displayed on the home screen 2030 to prompt the user to indicate whether an identified person was on time or late for work. The user of the mobile device can interact with a button 2034 to indicate that the identified person was on time for work. A user of the mobile device 1802 can interact with a button 2036 to indicate that the identified person was late for work. In at least some embodiments, interacting with the button 2034 and/or the button 2036 can cause the user interface 2030 to be removed from the home screen 2030.

Figure 21B:
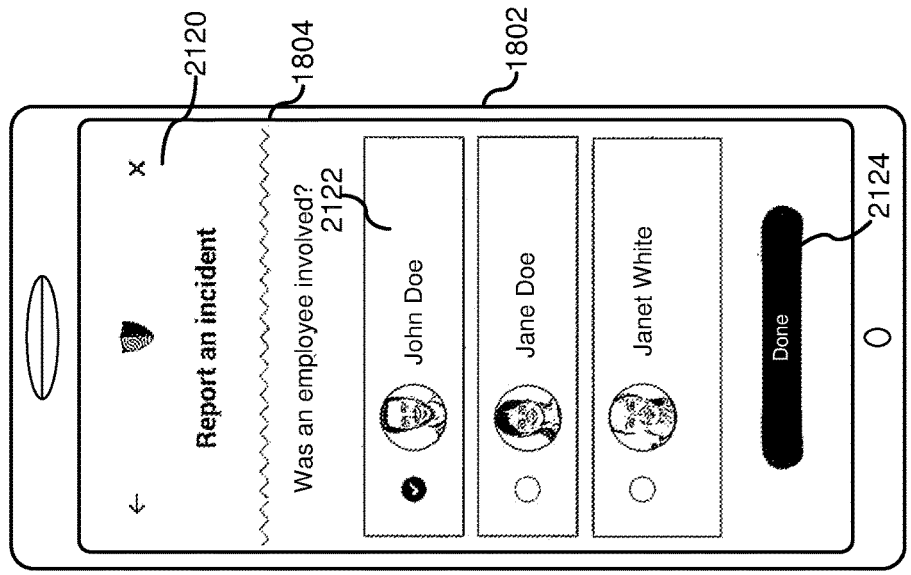
FIG. 21B is a diagram depicting an example mobile device user interface for identifying an individual involved in a reported criminal incident or accident.
Figure 21A:
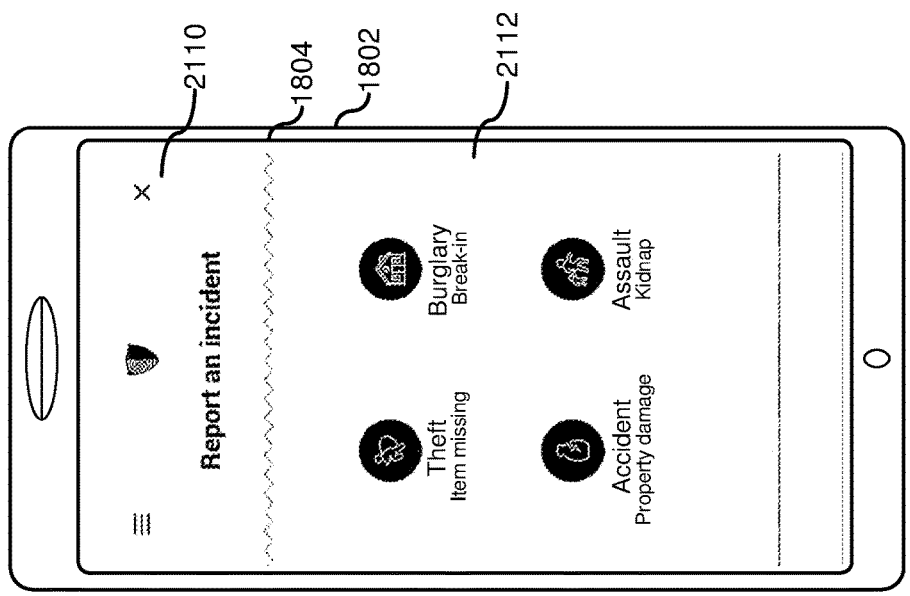
FIG. 21A is a diagram depicting an example mobile device user interface for reporting an accident or criminal incident.

FIG. 21A is a diagram depicting an example mobile device user interface 2110 for reporting an accident or criminal incident. A user of the mobile device 1802 can interact with one or more of buttons 2112 to indicate a type of incident to be reported. The types of incidents shown in FIG. 21A are provided for illustration and are not intended to be limiting.

FIG. 21B is a diagram depicting an example mobile device user interface 2120 for identifying an individual involved in a reported criminal incident or accident. The user interface 2120 comprises a listing of employees with verified identities 2122. In at least some embodiments, the employees presented in listing 2122 are employees scheduled to work when the reported criminal incident or accident occurred. A user of the mobile device 1802 can interact with one or more of the presented listings to indicate that one or more of the employees were involved in the reported criminal incident or accident. The user of the mobile device 1802 can interact with a button 2124 to confirm the selection.

In the example user interfaces described herein, the form factor and dimensions of the example mobile device 1802 are provided for illustration and are not intended to be limiting. The layout and visual representations of the various user interface components can readily be adjusted to accommodate different mobile devices with different form factors and/or different dimensions than those shown.

Example 20—Example Computing Systems

Figure 22:
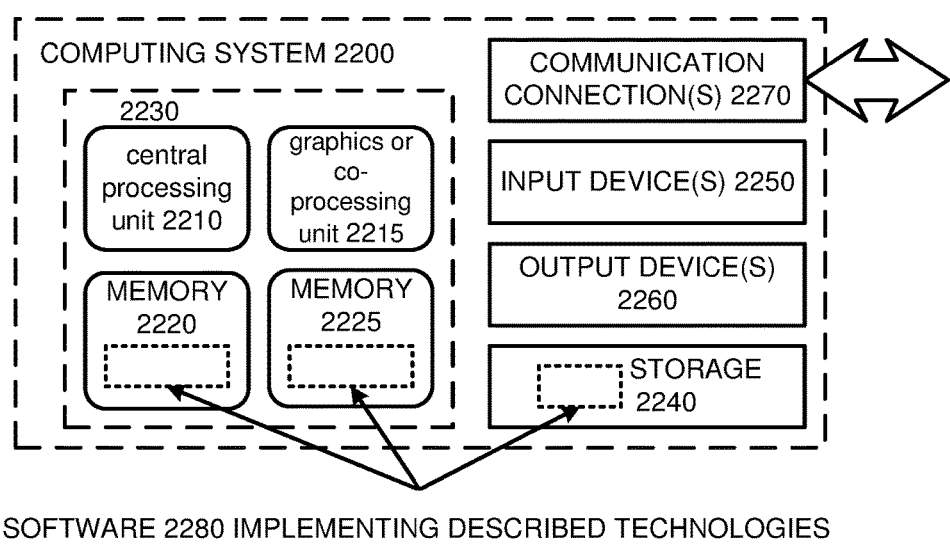
FIG. 22 is a block diagram of an example computing system in which some described embodiments can be implemented.

FIG. 22 depicts a generalized example of a suitable computing system 2200 in which the described innovations may be implemented. The computing system 2200 is not intended to suggest any limitation as to scope of use or functionality, as the innovations may be implemented in diverse general-purpose or special-purpose computing systems.

With reference to FIG. 22, the computing system 2200 includes one or more processing units 2210, 2215 and memory 2220, 2225. In FIG. 22, this basic configuration 2230 is included within a dashed line. The processing units 2210, 2215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 22 shows a central processing unit 2210 as well as a graphics processing unit or co-processing unit 2215. The tangible memory 2220, 2225 may be volatile memory (e.g., registers, cache, RAM), non-volatile memory (e.g., ROM, EEPROM, flash memory, solid state drives, etc.), or some combination of the two, accessible by the processing unit(s). The memory 2220, 2225 stores software 2280 implementing one or more innovations described herein, in the form of computer-executable instructions suitable for execution by the processing unit(s).

A computing system may have additional features. For example, the computing system 2200 includes storage 2240, one or more input devices 2250, one or more output devices 2260, and one or more communication connections 2270. An interconnection mechanism (not shown) such as a bus, controller, or network interconnects the components of the computing system 2200. Typically, operating system software (not shown) provides an operating environment for other software executing in the computing system 2200, and coordinates activities of the components of the computing system 2200.

The tangible storage 2240 may be removable or non-removable, and includes magnetic disks, magnetic tapes or cassettes, solid state drives, CD-ROMs, DVDs, or any other medium which can be used to store information in a non-transitory way and which can be accessed within the computing system 2200. The storage 2240 stores instructions for the software 2280 implementing one or more innovations described herein.

The input device(s) 2250 may be a touch input device such as a keyboard, mouse, pen, or trackball, a voice input device, a scanning device, or another device that provides input to the computing system 2200. For video encoding, the input device(s) 2250 may be a camera, video card, TV tuner card, or similar device that accepts video input in analog or digital form, or a CD-ROM or CD-RW that reads video samples into the computing system 2200. The output device(s) 2260 may be a display, printer, speaker, CD-writer, or another device that provides output from the computing system 2200.

The communication connection(s) 2270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 21—Example Cloud Computing Environment

Figure 23:
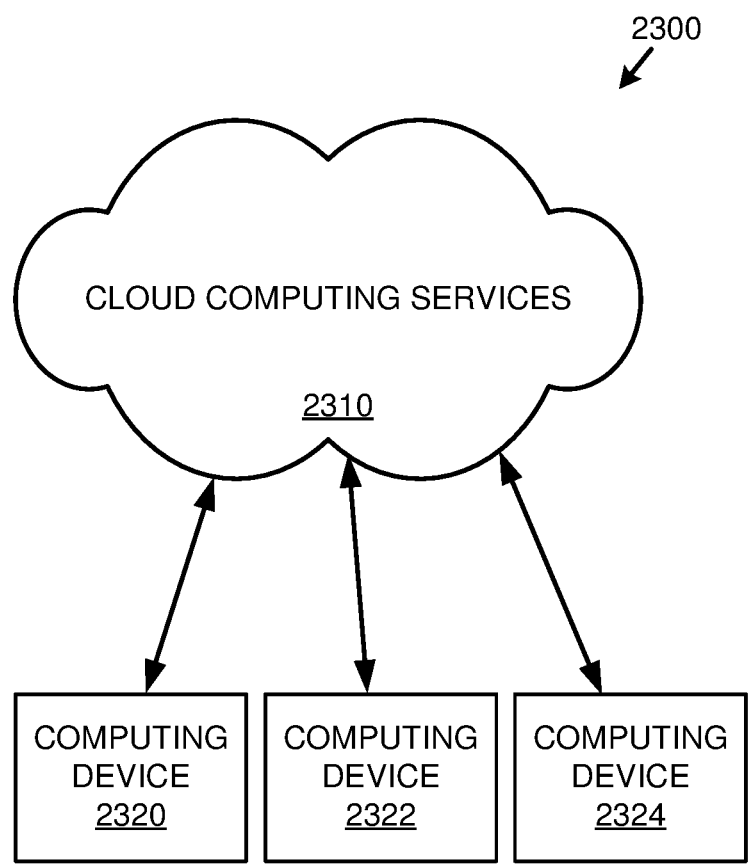
FIG. 23 is an example cloud computing environment that can be used in conjunction with the technologies described herein.

FIG. 23 depicts an example cloud computing environment 2300 in which the described technologies can be implemented. The cloud computing environment 2300 comprises cloud computing services 2310. The cloud computing services 2310 can comprise various types of cloud computing resources, such as computer servers, data storage repositories, networking resources, etc. The cloud computing services 2310 can be centrally located (e.g., provided by a data center of a business or organization) or distributed (e.g., provided by various computing resources located at different locations, such as different data centers and/or located in different cities or countries).

The cloud computing services 2310 are utilized by various types of computing devices (e.g., client computing devices), such as computing devices 2320, 2322, and 2324. For example, the computing devices (e.g., 2320, 2322, and 2324) can be computers (e.g., desktop or laptop computers), mobile devices (e.g., tablet computers or smart phones), or other types of computing devices. For example, the computing devices (e.g., 2320, 2322, and 2324) can utilize the cloud computing services 2310 to perform computing operators (e.g., data processing, data storage, and the like).

Example 22—Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media can include any tangible media that can be accessed within a computing environment (e.g., one or more optical media discs such as DVD or CD, volatile memory components (such as DRAM or SRAM), or non-volatile memory components (such as flash memory, solid state drives, or magnetic media such as hard drives)). By way of example and with reference to FIG. 22, computer-readable storage media include memory 2220 and 2225, and storage 2240. The term computer-readable storage media does not include signals and carrier waves. In addition, the term computer-readable storage media does not include communication connections (e.g., 2270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technologies may be applied, it should be recognized that the illustrated embodiments are examples of the disclosed technologies and should not be taken as a limitation on the scope of the disclosed technologies. Rather, the scope of the disclosed technologies includes what is covered by the scope and spirit of the following claims.

Example 23—Example Embodiments

1. A method for identity detection, the method comprising: receiving an image from a mobile device; validating the received image; using a facial recognition engine to identify facial features of a face depicted in the received image and to generate a facial feature template that represents the identified facial features; searching a facial feature template store for one or more facial feature templates that are similar to the generated facial feature template; identifying one of the stored facial feature templates that matches the generated facial feature template with a match that is greater than or equal to a specified match threshold; retrieving an image associated with the identified facial feature template and transmitting the retrieved image to the mobile device; receiving a message from the mobile device indicating that the image received from the mobile device and the image transmitted to the mobile device depict a same person; determining that the image transmitted to the mobile device is associated with profile information in a data store; and transmitting the profile information to the mobile device.

2. The method of claim 1, wherein validating the image comprises: receiving a geographic location of the mobile device with the received image; identifying one or more previously received images associated with geographic locations within a specified radius of the received geographic location; determining, based on the geographic location and the one or more previously received geographic locations, that the received image and the one or more previously received images are invalid; and marking one or more facial feature templates associated with the one or more previously received images as invalid.

3. The method of claim 2, wherein searching a facial feature template store for one or more facial feature templates that are similar to the generated facial feature template comprises omitting facial feature templates marked as invalid.

4. The method of claim 2, wherein the determining that the received image and the one or more previously received images are fraudulent is further based on a time at which the received image is received and one or more times at which the one or more previously received images were received.

5. The method of claim 1, wherein validating the received image comprises: determining, using the facial recognition engine, whether the received image depicts a human face before using the facial recognition engine to identify facial features; and if the received image does not depict a human face, transmitting a message to the mobile device indicating that no matches for the received image were found.

6. The method of claim 1, wherein identifying the one of the stored facial feature templates that matches the generated facial feature template comprises: adjusting facial feature similarity scores associated with facial features in the generated facial feature template and the one of the stored facial feature templates using specified weights, wherein the specified weights are selected based on facial feature types of the facial features; combining the adjusted facial feature similarity scores to produce an overall similarity score; and comparing the overall similarity score to the specified match threshold.

7. The method of claim 1, wherein: the data store is a graph database and the profile information is stored in one or more nodes of the graph database; and the method further comprises: storing the generated facial feature template in association with the received image, creating a node in the graph database for the received image, and associating the created node with one or more of the one or more nodes in the graph database storing the profile information.

8. The method of claim 7, further comprising: receiving an indication from the mobile device that the received image is an image of a prospective employee; locating one or more employment relationship records in the graph database associated with the profile information, wherein the one or more employment relationship records comprise data pertaining to one or more current or prospective jobs of the prospective employee; and transmitting employment data pertaining to the one or more current or prospective jobs of the prospective employee to the mobile device.

9. The method of claim 9, further comprising: locating a node in the graph database associated with the mobile device; and creating an employment relationship record associated with the node associated with the mobile device and at least one of the one or more nodes storing the profile information.

10. The method of claim 9, wherein the employment data comprises one or more geographic locations of the one or more current or prospective jobs of the prospective employee.

11. A non-transitory computer-readable medium comprising instructions that, when executed by a processor of a mobile computing device, cause the mobile computing device to perform operations, the operations comprising: capturing an image of the person using a camera of the mobile device; transmitting a request from the mobile device to a server to identify the person depicted in the captured image, the request comprising the captured image; receiving a second image at the mobile device, from the server, wherein the second image is a potential match to the captured image; displaying the received image on a user interface of the mobile device and prompting the user, via the user interface of the mobile device, to verify whether the received image is an image of the person; receiving an indication, via the user interface of the mobile device, that the received image is an image of the person; retrieving profile information associated with the received image from the server; and presenting the profile information to the user via the user interface of the mobile device.

12. The computer-readable medium of claim 11, wherein the operations further comprise: capturing a sequence of images using the camera of the mobile device; determining, using the captured sequence of images, whether a subject of the images is a living person, wherein the determining comprises identifying one or more variations in the sequence of images that indicates one or more facial movements; and if the subject of the images is a living person, transmitting the request to identify the person to the server; otherwise, not transmitting the request to identify the person to the server.

13. The non-transitory computer-readable medium of claim 12, wherein the determining further comprises determining that the one or more variations indicate one or more of an eye movement, and eyelid movement, or a head movement.

14. The non-transitory computer-readable medium of claim 12, wherein the determining further comprises transmitting the sequence of images to the server and receiving a response from the server indicating whether the subject of the images is a living person.

15. The computer-readable medium of claim 11, wherein the operations further comprise: displaying an image received from the camera of the mobile device on the user interface of the mobile device; displaying a cut-out on the user interface of the mobile device that overlays the image received from the camera of the mobile device and obscures a portion of the image that is outside the cut-out; and prompting the user, via the user interface of the mobile device, to adjust the location of the camera of the mobile device so that the person's face is visible within the cut-out before capturing the image of the person.

16. The computer-readable medium of claim 15, wherein the cut-out displayed on the user interface of the mobile device is in a shape of an outline of a human head.

17. The computer-readable medium of claim 11, further comprising: receiving an indication, via the user interface of the mobile device, that the received image is not an image of the person; prompting the user, via the user interface of the mobile device, to provide profile information for the person; receiving profile information for the person via the user interface of the mobile device; and transmitting the profile information to the server to be stored in association with the captured image.

18. The computer-readable medium of claim 11, wherein the received profile information comprises information pertaining to the person's current employment, including one or more ratings of the person provided by one or more of the person's employers.

19. The computer-readable medium of claim 18, wherein the operations further comprise: retrieving one or more geographic locations associated with the person's current employment from the server; and displaying the one or more locations associated with the person's current employment on a map on the user interface of the mobile device.

20. A system, comprising: a mobile device, comprising a processor; a camera; a display; a global positioning system (GPS) antennae; and a storage storing an application that, when executed by the processor, causes the mobile device to perform employee identity verification operations, the operations comprising: capturing multiple images depicting a prospective employee using the camera; determining, by detecting one or more differences in the multiple images, that the multiple images are images of the prospective employee and not a picture of the prospective employee; obtaining GPS coordinates of the mobile device using the GPS antennae; transmitting a request to a server to verify an identity of the prospective employee, the request comprising at least one of the captured images and the GPS coordinates; receiving a matched image from the server; displaying the matched image and one or more user interface components on the display, the one or more user interface components configured to receive input indicating whether or not the matched image is an image of the prospective employee; receiving input via at least one of the one or more user interface components indicating that the matched image is an image of the prospective employee; transmitting a message to the server, indicating that the matched image is an image of the prospective employee; receiving employment information from the server; and displaying the employment information on the display; the server, comprising another processor and another storage storing instructions that, when executed by the another processor, cause the server to perform identity detection operations, the operations comprising: receiving the request to verify the identity of the prospective employee, comprising the captured image and GPS coordinates, from the mobile device; determining, based at least in part on the GPS coordinates, that the request is legitimate; transmitting the captured image to a facial recognition server; receiving an identifier of the matched image from the facial recognition server; transmitting the matched image to the mobile device; receiving the message from the mobile device, indicating that the matched image is an image of the prospective employee; retrieving the employment information from a graph database, wherein the employment information is associated with the identifier of the matched image; and transmitting the employment information to the mobile device; the graph database, comprising: one or more employee nodes; one or more image nodes associated with the one or more employee nodes comprising image identifiers of associated images; and one or more employment relationships associated with at least one of the one or more employee nodes, wherein the one or more employment relationships comprise at least part of the employment information; and the facial recognition server, comprising a facial feature metadata store and a facial recognition engine configured to: receive the captured image form the server; extract facial feature metadata from the captured image; match the extracted facial feature metadata with facial feature metadata stored in the facial feature metadata store, wherein the matched facial feature metadata is associated with the image identifier of the matched image in the facial feature metadata store; and transmit the image identifier of the matched image to the server.

What is claimed is:

1. A method of identity detection, the method comprising:
receiving an image from a mobile device;
validating the received image, wherein validating the received image comprises:
 receiving a geographic location of the mobile device with the received image;
 identifying one or more previously received images associated with geographic locations within a specified radius of the received geographic location;
 identifying a geographically-based suspect data condition based on the geographic location and the one or more previously received geographic locations;
 responsive to identifying the geographically-based suspect condition, determining that the received image and the one or more previously received images are invalid; and
 marking one or more facial feature templates associated with the one or more previously received images as invalid;
identifying facial features of a face depicted in the validated received image and generating a facial feature template that represents the identified facial features using a facial recognition engine;
searching a facial feature template repository for one or more facial feature templates that are similar to the generated facial feature template;
identifying one of the stored facial feature templates that matches the generated facial feature template with a match that is greater than or equal to a specified match threshold;
retrieving an image associated with the identified facial feature template and transmitting the retrieved image to the mobile device;
receiving a message from the mobile device indicating that the image received from the mobile device and the image transmitted to the mobile device depict a same person;
determining that the image transmitted to the mobile device is associated with profile information in a data store; and
transmitting the profile information to the mobile device.

2. The method of claim 1, wherein searching a facial feature template repository for one or more facial feature templates that are similar to the generated facial feature template comprises omitting facial feature templates marked as invalid.

3. The method of claim 1, wherein the determining that the received image and the one or more previously received images are invalid is further based on a time at which the received image is received and one or more times at which the one or more previously received images were received.

4. The method of claim 1, further comprising:
receiving another image from another mobile device; and
validating the another image, wherein validating the another image comprises:
determining, using the facial recognition engine, whether the another image depicts a human face before using the facial recognition engine to identify facial features; and
if the another image does not depict a human face, transmitting a message to the another mobile device indicating that no matches for the another image were found.

5. The method of claim 1, wherein identifying the one of the stored facial feature templates that matches the generated facial feature template comprises:
adjusting facial feature similarity scores associated with facial features in the generated facial feature template and the one of the stored facial feature templates using specified weights, wherein the specified weights are selected based on facial feature types of the facial features;
combining the adjusted facial feature similarity scores to produce an overall similarity score; and
comparing the overall similarity score to the specified match threshold.

6. The method of claim 1, wherein:
the data store is a graph database and the profile information is stored in one or more nodes of the graph database; and
the method further comprises:
storing the generated facial feature template in association with the received image,
creating a node in the graph database for the received image, and
associating the created node with one or more of the one or more nodes in the graph database storing the profile information.

7. The method of claim 6, further comprising:
locating one or more nodes in the graph database associated with the profile information, wherein the one or more located nodes store one or more geographic locations associated with one or more corresponding sources of the profile information; and
transmitting the one or more geographic locations to the mobile device.

8. The method of claim 6, further comprising:
receiving a request from the mobile device for a picture of an identification card of the person;
identifying an image node in the graph database for an image node associated with the profile information, wherein the identified image node comprises a value indicating that an image associated with the image node is an identification card image;
retrieving the image associated with the identified image node; and
transmitting the retrieved image to the mobile device.

9. The method of claim 6, further comprising:
receiving another image from the mobile device and an indication that the another image is an image of an identification card of the person;
storing the received another image;
creating an image node in the graph database comprising a location of the stored another image associated with the located node and a value indicating that the another image is the image of the identification card of the person; and
associating the created image node with a node in the graph database associated with the profile information.

10. A system, comprising:
a mobile device comprising a processor and a non-transitory computer-readable medium comprising instructions that, when executed by the processor of the mobile computing device, cause the mobile computing device to perform operations, the operations comprising:
capturing an image of the person using a camera of the mobile device;
transmitting a request from the mobile device to a server to identify the person depicted in the captured image, the request comprising the captured image and a geographic location of the mobile device;
receiving a second image at the mobile device, from the server, wherein the second image is a potential match to the captured image;
displaying the received image on a user interface of the mobile device and prompting the user, via the user interface of the mobile device, to verify whether the received image is an image of the person;
receiving an indication, via the user interface of the mobile device, that the received image is an image of the person;
retrieving profile information associated with the received image from the server; and
presenting the profile information to the user via the user interface of the mobile device; and
the server, wherein the server comprises a processor and another computer-readable medium comprising instructions that, when executed by the processor of the server, cause the server to perform operations, comprising:
receiving the request from the mobile device to identify the person depicted in the captured image; and
validating the captured image, wherein validating the captured image comprises:
identifying one or more previously received images associated with geographic locations within a specified radius of the geographic location of the mobile device;
identifying a geographically-based suspect data condition based on the geographic location of the mobile device and the one or more previously received geographic locations;
responsive to identifying the geographically-based suspect condition, determining that the received image and the one or more previously received images are invalid; and
marking one or more facial feature templates associated with the one or more previously received images as invalid.

11. The system of claim 10, wherein the operations performed by the mobile computing device further comprise:
capturing a sequence of images using the camera of the mobile device;
determining, using the captured sequence of images, whether a person depicted in the images is physically present at the mobile device when the sequence of images was captured by the mobile device, wherein the determining comprises identifying one or more variations in the sequence of images that indicates one or more facial movements; and
if the subject of the images is a living person, transmitting the request to identify the person to the server;

otherwise, not transmitting the request to identify the person to the server.

12. The system of claim 11, wherein the determining further comprises determining that the one or more variations indicate one or more of an eye movement, and eyelid movement, or a head movement.

13. The system of claim 11, wherein the determining further comprises transmitting the sequence of images to the server and receiving a response from the server indicating whether the subject of the images is a living person.

14. The system of claim 10, wherein the operations performed by the mobile device further comprise:
   displaying an image received from the camera of the mobile device on the user interface of the mobile device;
   displaying a cut-out on the user interface of the mobile device that overlays the image received from the camera of the mobile device and obscures a portion of the image that is outside the cut-out; and
   prompting the user, via the user interface of the mobile device, to adjust the location of the camera of the mobile device so that the person's face is visible within the cut-out before capturing the image of the person.

15. The system of claim 14, wherein the cut-out displayed on the user interface of the mobile device is in a shape of an outline of a human head.

16. The system of claim 10, wherein the operations performed by the mobile device further comprise:
   receiving an indication, via the user interface of the mobile device, that the received image is not an image of the person;
   prompting the user, via the user interface of the mobile device, to provide profile information for the person;
   receiving profile information for the person via the user interface of the mobile device; and
   transmitting the profile information to the server to be stored in association with the captured image.

17. The system of claim 10, wherein the operations performed by the mobile device further comprise:
   receiving an image of an identification document of the person via the user interface of the mobile device; and
   transmitting a message to the server comprising the image of the identification document and a value indicating that the image is an image of the identification document of the person.

18. The system of claim 10, wherein the operations performed by the mobile device further comprise:
   retrieving an image of an identification document of the person from the server; and
   displaying the image of the identification document on the user interface of the mobile device.

19. A system, comprising:
   a mobile device, comprising a processor; a camera; a display; a global positioning system (GPS) antenna; and a storage storing an application that, when executed by the processor, causes the mobile device to perform identity verification operations, the operations comprising:
      capturing multiple images depicting a person using the camera;
      determining, by detecting one or more differences in the multiple images, that the multiple images are images of a person and not a picture of the person;
      obtaining GPS coordinates of the mobile device using the GPS antenna;
      transmitting a request to a server to verify an identity of the person, the request comprising at least one of the captured images and the GPS coordinates;
      receiving a matched image from the server;
      displaying the matched image and one or more user interface components on the display, the one or more user interface components configured to receive input indicating whether or not the matched image is an image of the person;
      receiving input via at least one of the one or more user interface components indicating that the matched image is an image of the person;
      transmitting a message to the server, indicating that the matched image is an image of the person;
      receiving information related to the identity of the person from the server; and
      displaying the information related to the identity of the person on the display;
   the server, comprising another processor and another storage storing instructions that, when executed by the another processor, cause the server to perform identity detection and validation operations, the operations comprising:
      receiving the request to verify the identity of the person, comprising the at least one captured image and GPS coordinates, from the mobile device;
      determining, based at least in part on the GPS coordinates, that the image is valid, wherein determining that the image is valid comprises:
         identifying one or more previously received images associated with GPS coordinates within a specified radius of the received GPS coordinates,
         identifying a geographically-based suspect data condition based on the received GPS coordinates and the one or more previously received GPS coordinates,
         responsive to identifying the geographically-based suspect condition, determining that the one or more previously received images are invalid, and
         marking one or more facial feature templates associated with the one or more previously received images as invalid;
      transmitting the captured image to a facial recognition server;
      receiving an identifier of the matched image from the facial recognition server;
      transmitting the matched image to the mobile device;
      receiving the message from the mobile device, indicating that the matched image is an image of the person;
      retrieving the information related to the identity of the person from a graph database, wherein the information is associated with the identifier of the matched image; and
      transmitting the information related to the identity of the person to the mobile device;
   the graph database, comprising:
      one or more person nodes;
      one or more image nodes associated with the one or more person nodes comprising image identifiers of associated images; and
      one or more relationships associated with at least one of the one or more person nodes, wherein the one or more relationships comprise at least part of the information related to the identity of the person; and
   the facial recognition server, comprising a facial feature templates store and a facial recognition engine configured to:

receive the at least one captured image from the server;
extract facial feature template from the at least one captured image;
match the extracted facial feature template with facial feature templates stored in the facial feature template store, wherein the matched facial feature template is associated with the image identifier of the matched image in the facial feature template store; and
transmit the image identifier of the matched image to the server.

\* \* \* \* \*